US009357245B1

(12) United States Patent (10) Patent No.: US 9,357,245 B1
Del Beccaro et al. (45) Date of Patent: *May 31, 2016

(54) SYSTEM AND METHOD FOR PROVIDING AN INTERACTIVE, VISUAL COMPLEMENT TO AN AUDIO PROGRAM

(71) Applicant: Music Choice, Horsham, PA (US)

(72) Inventors: David J. Del Beccaro, Jenkintown, PA (US); Stuart H. Farber, Horsham, PA (US); Kelley L. Giannetti, Gilbertsville, PA (US); Donna M. O'Neill, Ambler, PA (US); Jeremy C. Rosenberg, Huntingdon Valley, PA (US); Robert M. Steinberg, Horsham, PA (US); Christina B. Tancredi, Ambler, PA (US); Ronald M. Yurman, Short Hills, NJ (US)

(73) Assignee: Music Choice, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,619

(22) Filed: Mar. 2, 2015

Related U.S. Application Data

(63) Continuation of application No. 14/314,379, filed on Jun. 25, 2014, which is a continuation of application No. 13/082,791, filed on Apr. 8, 2011, now Pat. No. 8,769,602, which is a continuation of application No.

(Continued)

(51) Int. Cl.
*H04N 7/10* (2006.01)
*H04N 7/025* (2006.01)
(Continued)

(52) U.S. Cl.
CPC ....... *H04N 21/2368* (2013.01); *H04N 21/4394* (2013.01); *H04N 21/8113* (2013.01); *H04N 21/8133* (2013.01)

(58) Field of Classification Search
CPC ............ H04N 21/812; H04N 21/4331; H04N 21/435; H04N 21/235; H04N 7/165; H04N 7/17318; H04N 21/25891; H04N 21/44222; H04N 21/6582; H04N 2007/1739; H04N 7/173; H04N 5/44543; H04N 5/50; H04N 7/22; G06Q 30/02; G06Q 10/10; H04L 29/08072; H04L 29/06; H04L 29/0809; H04L 29/08981; H04L 29/08117; H04H 60/66; H04H 60/43; H04H 60/33
See application file for complete search history.

(56) References Cited

U.S. PATENT DOCUMENTS 4,016,362 A 4/1977 Bristow et al.
4,081,829 A 3/1978 Brown
(Continued)

FOREIGN PATENT DOCUMENTS

EP 1 022 900 A1 7/2000
JP 11260045 A 9/1999
(Continued)

OTHER PUBLICATIONS

"The ICTV Digital Broadband System", ICTV Inc., ICTV Whitepaper, Nov. 2000, 11 pages.
(Continued)

*Primary Examiner* — Ngoc Vu
(74) *Attorney, Agent, or Firm* — Rothwell, Figg, Ernst & Manbeck, P.C.

(57) ABSTRACT

A system and method for providing an interactive, visual complement to one or more audio programs. In one aspect, the system comprises an audio subsystem for generating an audio signal corresponding to a sound recording. The system also comprises a video subsystem for generating a video image specification based, at least in part, on the sound recording. In one aspect, the audio signal and video image specification are transmitted to an audio/video signal transmission system. The transmission system receives the video image specification and generates a video signal that conforms to the video image specification. The video signal and the audio signal are transmitted to at least one consumer receiver. In this way, the system provides a visual complement to an audio program.

17 Claims, 21 Drawing Sheets

Related U.S. Application Data

11/837,772, filed on Aug. 13, 2007, now Pat. No. 7,926,085, which is a continuation of application No. 10/066,793, filed on Feb. 6, 2002, now Pat. No. 7,275,256.

(60) Provisional application No. 60/315,046, filed on Aug. 28, 2001.

(51) Int. Cl.
*H04N 21/2368* (2011.01)
*H04N 21/81* (2011.01)
*H04N 21/439* (2011.01)

(56) References Cited

U.S. PATENT DOCUMENTS

| | | |
|---|---|---|
| 4,127,796 A | 11/1978 | Henderson |
| RE29,997 E | 5/1979 | Den Toonder |
| 4,314,236 A | 2/1982 | Mayer et al. |
| 4,336,478 A | 6/1982 | Quilty et al. |
| 4,338,623 A | 7/1982 | Asmus et al. |
| 4,360,805 A | 11/1982 | Andrews et al. |
| 4,677,430 A | 6/1987 | Falkman et al. |
| 4,722,005 A | 1/1988 | Ledenbach |
| 4,760,455 A | 7/1988 | Nagashima |
| 4,799,156 A | 1/1989 | Shavit et al. |
| 5,130,615 A | 7/1992 | George |
| 5,168,481 A | 12/1992 | Culbertson et al. |
| 5,193,006 A | 3/1993 | Yamazaki |
| 5,282,028 A | 1/1994 | Johnson et al. |
| 5,283,639 A | 2/1994 | Esch et al. |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. |
| 5,418,654 A | 5/1995 | Scheffler |
| 5,481,296 A | 1/1996 | Cragun et al. |
| 5,481,509 A | 1/1996 | Knowles |
| 5,499,046 A | 3/1996 | Schiller et al. |
| 5,534,911 A | 7/1996 | Levitan |
| 5,542,037 A | 7/1996 | Sato |
| 5,550,863 A | 8/1996 | Yurt et al. |
| 5,557,541 A | 9/1996 | Schulhof et al. |
| 5,559,548 A | 9/1996 | Davis et al. |
| 5,572,442 A | 11/1996 | Schulhof et al. |
| 5,585,866 A | 12/1996 | Miller et al. |
| 5,588,096 A | 12/1996 | Sato |
| 5,590,282 A | 12/1996 | Clynes |
| 5,592,511 A | 1/1997 | Schoen et al. |
| 5,616,876 A | 4/1997 | Cluts |
| 5,617,565 A | 4/1997 | Augenbraun et al. |
| 5,629,867 A | 5/1997 | Goldman |
| 5,635,989 A | 6/1997 | Rothmuller |
| 5,636,276 A | 6/1997 | Brugger |
| 5,657,096 A | 8/1997 | Lukacs |
| 5,675,734 A | 10/1997 | Hair |
| 5,689,081 A | 11/1997 | Tsurumi |
| 5,708,780 A | 1/1998 | Levergood et al. |
| 5,721,815 A | 2/1998 | Ottesen et al. |
| 5,726,909 A | 3/1998 | Krikorian |
| 5,734,719 A | 3/1998 | Tsevdos et al. |
| 5,734,961 A | 3/1998 | Castille |
| 5,740,549 A | 4/1998 | Reilly et al. |
| 5,751,282 A | 5/1998 | Girard et al. |
| 5,753,844 A | 5/1998 | Matsumoto |
| 5,754,939 A | 5/1998 | Herz et al. |
| 5,761,606 A | 6/1998 | Wolzien |
| 5,761,607 A | 6/1998 | Gudesen |
| 5,761,662 A | 6/1998 | Dasan |
| 5,781,889 A | 7/1998 | Martin et al. |
| 5,784,095 A | 7/1998 | Robbins et al. ................ 346/6 |
| 5,784,595 A | 7/1998 | Devins et al. |
| 5,790,935 A | 8/1998 | Payton |
| 5,793,980 A | 8/1998 | Glaser et al. |
| 5,796,423 A | 8/1998 | Robbins et al. |
| 5,796,945 A | 8/1998 | Tarabella |
| 5,809,144 A | 9/1998 | Sirbu et al. |
| 5,809,246 A | 9/1998 | Goldman |
| 5,810,603 A | 9/1998 | Kato |
| 5,818,512 A | 10/1998 | Fuller |
| 5,819,049 A | 10/1998 | Rietmann |
| 5,819,160 A | 10/1998 | Foladare et al. |
| 5,832,120 A | 11/1998 | Prabhakar et al. |
| 5,835,487 A | 11/1998 | Campanella ................ 370/316 |
| 5,841,979 A | 11/1998 | Schulhof et al. |
| 5,848,398 A | 12/1998 | Martin et al. |
| 5,861,906 A | 1/1999 | Dunn et al. |
| 5,878,141 A | 3/1999 | Daly et al. |
| 5,885,085 A | 3/1999 | Fujita |
| 5,890,137 A | 3/1999 | Koreeda |
| 5,890,139 A | 3/1999 | Suzuki et al. |
| 5,899,699 A | 5/1999 | Kamiya |
| 5,899,980 A | 5/1999 | Wilf et al. |
| 5,900,566 A | 5/1999 | Mino et al. |
| 5,900,830 A | 5/1999 | Scheffler |
| 5,913,204 A | 6/1999 | Kelly |
| 5,918,213 A | 6/1999 | Bernard et al. |
| 5,926,624 A | 7/1999 | Katz et al. |
| 5,930,765 A | 7/1999 | Martin |
| 5,930,768 A | 7/1999 | Hooban |
| 5,931,901 A | 8/1999 | Wolfe et al. |
| 5,933,500 A | 8/1999 | Blatter et al. |
| 5,943,422 A | 8/1999 | Van Wie et al. |
| 5,944,608 A | 8/1999 | Reed et al. |
| 5,959,945 A | 9/1999 | Kleiman |
| 5,960,411 A | 9/1999 | Hartman et al. |
| 5,961,662 A | 10/1999 | Yamaguchi et al. |
| 5,968,120 A | 10/1999 | Guedalia |
| 5,969,283 A | 10/1999 | Looney et al. |
| 5,970,474 A | 10/1999 | LeRoy et al. |
| 5,973,722 A | 10/1999 | Wakai et al. |
| 5,980,261 A | 11/1999 | Mino et al. |
| 5,986,692 A | 11/1999 | Logan et al. |
| 5,991,374 A | 11/1999 | Hazenfield |
| 5,991,737 A | 11/1999 | Chen |
| 6,011,761 A | 1/2000 | Inoue |
| 6,011,854 A | 1/2000 | Van Ryzin |
| 6,020,883 A | 2/2000 | Herz et al. |
| 6,021,432 A | 2/2000 | Sizer, II et al. |
| 6,025,868 A | 2/2000 | Russo |
| 6,035,336 A | 3/2000 | Lu |
| 6,038,591 A | 3/2000 | Wolfe et al. |
| 6,055,314 A | 4/2000 | Spies et al. |
| 6,055,566 A | 4/2000 | Kikinis |
| 6,085,235 A | 7/2000 | Clarke, Jr. et al. |
| 6,088,455 A | 7/2000 | Logan et al. |
| 6,088,722 A | 7/2000 | Herz et al. |
| 6,105,060 A | 8/2000 | Rothblatt |
| 6,108,028 A | 8/2000 | Skarbo et al. |
| 6,118,450 A | 9/2000 | Proehl |
| 6,135,646 A | 10/2000 | Kahn et al. |
| 6,151,634 A | 11/2000 | Glaser et al. |
| 6,154,772 A | 11/2000 | Dunn et al. |
| 6,161,142 A | 12/2000 | Wolfe et al. |
| 6,192,340 B1 | 2/2001 | Abecassis |
| 6,195,693 B1 * | 2/2001 | Berry et al. ................ 709/219 |
| 6,210,170 B1 | 4/2001 | Sorensen |
| 6,223,210 B1 | 4/2001 | Hickey |
| 6,223,292 B1 | 4/2001 | Dean et al. |
| 6,226,030 B1 | 5/2001 | Harvey et al. |
| 6,226,618 B1 | 5/2001 | Downs et al. |
| 6,229,895 B1 | 5/2001 | Son et al. |
| 6,230,322 B1 | 5/2001 | Saib et al. |
| 6,232,539 B1 | 5/2001 | Looney et al. |
| 6,233,682 B1 | 5/2001 | Fritsch |
| 6,240,553 B1 | 5/2001 | Son et al. |
| 6,243,725 B1 | 6/2001 | Hempleman et al. |
| 6,246,672 B1 | 6/2001 | Lumelsky |
| 6,248,946 B1 | 6/2001 | Dwek |
| 6,249,810 B1 | 6/2001 | Kiraly |
| 6,253,235 B1 | 6/2001 | Estes |
| 6,253,237 B1 | 6/2001 | Story et al. |
| 6,256,008 B1 | 7/2001 | Sparks et al. |

(56) References Cited

U.S. PATENT DOCUMENTS

| | | | |
|---|---|---|---|
| 6,262,772 B1 | 7/2001 | Shen et al. |
| 6,266,369 B1 | 7/2001 | Wang et al. |
| 6,279,040 B1 | 8/2001 | Ma et al. |
| 6,286,139 B1 | 9/2001 | Decinque |
| 6,305,020 B1 | 10/2001 | Horaty et al. |
| 6,324,217 B1 | 11/2001 | Gordon |
| 6,330,595 B1 | 12/2001 | Ullman et al. |
| 6,330,609 B1 | 12/2001 | Garofalakis et al. |
| 6,338,044 B1 | 1/2002 | Cook et al. |
| 6,349,329 B1 | 2/2002 | MacKintosh |
| 6,364,485 B1 | 4/2002 | Fateh |
| 6,369,851 B1 | 4/2002 | Marflak et al. |
| 6,389,467 B1 | 5/2002 | Eyal |
| 6,418,421 B1 | 7/2002 | Hurtado et al. |
| 6,434,621 B1 | 8/2002 | Pezzillo et al. |
| 6,434,747 B1 | 8/2002 | Khoo et al. |
| 6,446,130 B1 | 9/2002 | Grapes |
| 6,448,956 B1 | 9/2002 | Berman et al. |
| 6,456,335 B1 | 9/2002 | Miura |
| 6,486,900 B1 | 11/2002 | Shen |
| 6,490,728 B1 | 12/2002 | Kitazato |
| 6,505,240 B1 | 1/2003 | Blumenau |
| 6,526,411 B1 | 2/2003 | Ward |
| 6,539,210 B1 | 3/2003 | Heredia et al. |
| 6,550,011 B1 | 4/2003 | Sims, III |
| 6,578,201 B1 | 6/2003 | LaRocca et al. ............... 725/86 |
| 6,587,127 B1 | 7/2003 | Leeke et al. |
| 6,587,837 B1 | 7/2003 | Spagna et al. |
| 6,588,015 B1 | 7/2003 | Eyer et al. |
| 6,636,220 B1 | 10/2003 | Szelislci et al. |
| 6,643,326 B1 | 11/2003 | Fukunaga et al. |
| 6,668,158 B1 | 12/2003 | Tsutsui |
| 6,748,427 B2 | 6/2004 | Drosset |
| 6,757,833 B2 | 6/2004 | Wakai et al. |
| 6,766,357 B1 | 7/2004 | Fandozzi |
| 6,842,604 B1 | 1/2005 | Cook et al. |
| 6,856,328 B2 | 2/2005 | Holtslag |
| 6,856,550 B2 | 2/2005 | Kato et al. |
| 6,865,550 B1 | 3/2005 | Cok |
| 6,898,800 B2 | 5/2005 | Son et al. |
| 6,907,574 B2 | 6/2005 | Xu et al. |
| 6,924,845 B1 | 8/2005 | Wahlroos |
| 6,933,433 B1 | 8/2005 | Porteus |
| 6,966,064 B1 | 11/2005 | Schneidewend et al. |
| 6,990,312 B1 | 1/2006 | Gioscia |
| 7,010,801 B1 | 3/2006 | Jerding |
| 7,020,888 B2 | 3/2006 | Reynolds et al. |
| 7,028,082 B1 | 4/2006 | Rosenberg et al. |
| 7,065,287 B1 | 6/2006 | Heredia et al. |
| 7,076,561 B1 | 7/2006 | Rosenberg et al. |
| 7,133,924 B1 | 11/2006 | Rosenberg et al. |
| 7,149,471 B1 | 12/2006 | Arisawa et al. |
| 7,158,169 B1 | 1/2007 | Farber et al. |
| 7,209,900 B2 | 4/2007 | Hunter et al. |
| 7,275,256 B1 | 9/2007 | Del Beccaro et al. |
| 7,308,485 B2 | 12/2007 | Roberts et al. |
| 7,313,810 B1 | 12/2007 | Bell |
| 7,325,043 B1 | 1/2008 | Rosenberg et al. |
| 8,769,602 B1 * | 7/2014 | Del Beccaro et al. ........ 725/143 |
| 2001/0032312 A1 | 10/2001 | Runje et al. |
| 2001/0035874 A1 | 11/2001 | Hamilton et al. |
| 2001/0042107 A1 | 11/2001 | Palm |
| 2001/0049826 A1 | 12/2001 | Wilf |
| 2002/0021708 A1 | 2/2002 | Ishiai |
| 2002/0023164 A1 | 2/2002 | Lahr |
| 2002/0023166 A1 | 2/2002 | Bar-Noy et al. |
| 2002/0032728 A1 | 3/2002 | Sako et al. |
| 2002/0038359 A1 | 3/2002 | Ihara et al. |
| 2002/0046084 A1 | 4/2002 | Steele et al. |
| 2002/0056117 A1 | 5/2002 | Hasegawa et al. |
| 2002/0056118 A1 | 5/2002 | Hunter et al. |
| 2002/0059621 A1 | 5/2002 | Thomas et al. |
| 2002/0062261 A1 | 5/2002 | Mukai |
| 2002/0075321 A1 | 6/2002 | Sakatani |
| 2002/0083148 A1 | 6/2002 | Shaw et al. |
| 2002/0104082 A1 | 8/2002 | Fries |
| 2002/0130892 A1 | 9/2002 | Holtslag |
| 2002/0138630 A1 | 9/2002 | Solomon et al. |
| 2002/0152278 A1 | 10/2002 | Pontenzone |
| 2002/0184623 A1 | 12/2002 | Hodge et al. |
| 2002/0194260 A1 | 12/2002 | Headley et al. |
| 2002/0194619 A1 | 12/2002 | Chang et al. |
| 2003/0023975 A1 | 1/2003 | Schrader et al. |
| 2003/0050058 A1 | 3/2003 | Walsh |
| 2003/0097338 A1 | 5/2003 | Mankovich et al. |
| 2003/0135464 A1 | 7/2003 | Mourad et al. |
| 2003/0182184 A1 | 9/2003 | Strasnick et al. |
| 2006/0173974 A1 | 8/2006 | Tang |

FOREIGN PATENT DOCUMENTS

| | | |
|---|---|---|
| JP | 2000207417 A | 7/2000 |
| JP | 2000305588 A | 11/2000 |
| JP | 2002215174 A | 7/2002 |
| WO | WO 93/18465 A1 | 9/1993 |
| WO | WO 97/37492 A1 | 10/1997 |
| WO | WO 99/17230 A1 | 4/1999 |
| WO | WO 99/48296 A1 | 9/1999 |
| WO | WO 00/07368 A1 | 2/2000 |
| WO | WO 01/35874 A1 | 5/2001 |
| WO | WO 01/36064 A1 | 5/2001 |

OTHER PUBLICATIONS

"Worldgate Offers Java for Internet-Over-Cable Service", Computergram International, Nov. 18, 1998, 1 page.

"WorldGate Receives Patent for Ultra Thin-Client Computing Architecture; Technology Key for Using Existing Cable Plant for Delivering Internet Access Through the TV", Business Wire, Sep. 7, 1999, 2 pages.

"Music Choice and WorldGate Team Up to Offer Simultaneous Music Listening", Business Wire, May 5, 1998, 2 pages.

Balachandran et al., "Rapid Video Browsing on a VCR Using a TV Set-top Box", IRMA International Conference, 2000, pp. 250-254.

Weather Channel Broadcast from Apr. 4, 2000, TWC Broadcast, www.twctoday.com/xl.html, 3 pages.

Barry Fox, "Orbiting TV pictures dodge screen burn", NewScientist. com news service, Mar. 21, 2002, 2 pages.

"Challenges of Information Technology Management in the $21^{st}$ Century", IRMA International Conference, 2000, cover page and table of contents, 11 pages.

Radio Sonicnet Screenshots from archive.org., 6 pages.

Complaint for Patent Infringement, Civil Action No. 08-130(SLR), dated Mar. 4, 2008, 8 pages.

Answer and Counterclaim of Defendants, Civil Action No. 08-130(SLR), dated Apr. 23, 2008, 11 pages.

Answer to Counterclaims, Civil Action No. 08-130(SLR), dated May 5, 2008, 5 pages.

Responses of Plaintiff Music Choice to Defendants' First Set of Requests for Production of Documents and Things, Civil Action No. 08-130 (SLR), dated Jul. 14, 2008, 36 pages.

Responses of Plaintiff Music Choice to Defendant MTV Networks First Set of Interrogatories (Nos. 1-13) with Exhibits 1-5, Civil Action No. 08-130 (SLR), dated Jul. 14, 2008, 97 pages.

Viacom International Inc.'s Responses to Plaintiff's First Set of Requests for Production (Nos. 1-85), Civil Action No. 08-130 (SLR), dated Jul. 14, 2008, 67 pages.

Viacom Inc.'s Responses to Plaintiff's First Set of Requests for Production (Nos. 1-85), Civil Action No. 08-130 (SLR), dated Jul. 14, 2008, 65 pages.

MTV Networks' Responses to Plaintiff's First Set of Requests for Production (Nos. 1-85), Civil Action No. 08-130 (SLR), dated Jul. 14, 2008, 65 pages.

Viacom Inc.'s Response to Plaintiff's First Set of Interrogatories (Nos. 1-13), Civil Action No. 08-130 (SLR), dated Jul. 14, 2008, 20 pages.

MTV Network's Response to Plaintiff's First Set of Interrogatories (Nos. 1-13), Civil Action No. 08-130 (SLR), dated Jul. 14, 2008, 22 pages.

(56) References Cited

OTHER PUBLICATIONS

Viacom International's Response to Plaintiff's First Set of Interrogatories (Nos. 1-13), Civil Action No. 08-130 (SLR), dated Jul. 14, 2008, 21 pages.
Viacom International Inc.'s Responses to Plaintiff's Second Set of Requests for Production (Nos. 86-103), Civil Action No. 08-130 (SLR), dated Jul. 30, 2008, 19 pages.
MTV Networks' Responses to Plaintiff's Second Set of Requests for Production (Nos. 86-103), Civil Action No. 08-130 (SLR), dated Jul. 30, 2008, 19 pages.
Viacom Inc.'s Responses to Plaintiff's Second Set of Requests for Production (Nos. 86-103), Civil Action No. 08-130 (SLR), dated Jul. 30, 2008, 18 pages.
Plaintiff Music Choice's First Supplemental Responses to Defendant MTV Network's First Set of Interrogatories, Civil Action No. 08-130 (SLR), dated Jan. 9, 2009, 20 pages.
Defendants' Amended Response to Plaintiff's Contention Interrogatories on Which Defendants Bear Burden of Proof (No. 5) with Exhibit A, Civil Action No. 08-130 (SLR), dated Jan. 9, 2009, 264 pages.
Plaintiff Music Choice's Responses to Defendant Viacom International Inc.'s First Set of Interrogatories (Nos. 1-13), Civil Action No. 08-130 (SLR), dated Jan. 9, 2009, 24 pages.
Defendants' Amended Responses to Plaintiffs First Set of Interrogatories 1-13 with Supplement to Exhibit A, Civil Action No. 08-130 (SLR), dated Jan. 20, 2009, 27 pages.
Defendants' Amended Responses to Plaintiff's Responsive Contention Interrogatories Nos. 3,4,6,10, Civil Action No. 08-130 (SLR), dated Feb. 9, 2009, 15 pages.
Plaintiff's Supplemental Response to Defendants' Contention Interrogatories on Which Defendants Bear the Burden of Proof, Civil Action No. 08-130 (SLR), dated Feb. 9, 2009, 89 pages.
Shareware Music Machine News, Shareware Music Machine.com, "MusicMatch Jukebox 6.0 gets personal", Press Release, Oct. 6, 2000, 4 pages.
Loeb, S., "Architecting Personalized Delivery of Multimedia Information", Information Filtering, Communication of the ACM, Dec. 1992, vol. 35, No. 12, pp. 39-48.
6 Pages from the web site for www.request.com.
Clark D., "ClickRadio to Start Digital Music Services," WSJ Interactive Edition, 2000.
"ClickRadio granted first interactive radio license by universal music group; . . . ," www.clickradio.com, printed Apr. 26, 2000.
Gordon, C., "Clickradio sidesteps competition with music licensing deals," Atnewyork.com, May 12, 2000.
"Phillips showcases clickradio on digital set-top at western show 2000; . . . ," Business Wire, Inc., Nov. 29, 2000.
Six pages form the web site for www.sonicnet.com.
http://launch.yahoo.com, "Music on Yahoo", 2 pages.
"Sonicbox brings Net radio into your living room," (Partyka, Jeff. Oct. 12, 1999, CNN.com), 3 pages.
"Internet Radio Listeners Unchained From Their PCs," (Olenick, Doug. Oct. 25, 1999. Twice Computer Technology), 1 page.
"Sonicbox and Microsoft Bring Windows Media Internet Radio to the Home Stereo," (Dec. 7, 1999 Microsoft Press Release), 3 pages.
King, B. "Tune on, Tune in, Drop Cash" Dec. 8, 2000, Wired News, 4 pages.
"Global Media Announces Launch of Independent Internet Radio station,"; News Release, Feb. 1, 1999, 2 pages.
"Platinum Entertainment and Liquid Audio Join Forces to Offer Extensive Music Catalog via Digital Downloads", Press Release, Jul. 15, 1998, 2 pages.
LaFrance, "Thinking Globally with a web-based radio station vying for listeners around the world, homegrown internet company fastband aims to shake up the music world", Times Picayune, Nov. 4, 1999, 2 pages.
"Tune into Yahoo! Radio," Yahoo Media Relations Press Release, Yahoo! teams up with Boradcast.com and Spinner.com to Provide 10 stations of Audio Programming, May 11, 1999, 2 pages.
Yahoo Offers one-stop shop for e-music, Milwaukee Journal Sentinel (Wisconsin), Aug. 25, 1999, 1 page.
uniView Technologies Now In Yahoo!'s Multicast Affiliate Program, Press Release Newswire Association, Inc., Oct. 19, 1999, 2 pages.
"WebRadio.com Signs on as Liquid Music Network Affiliate Offering Liquid Audio Digital Downloads," Business Wire, Inc., Sep. 1, 1999, 2 pages.
"Blue Note Radio," Now Playing on a Computer Screen Near You. EMI's Blue Note Records Expands New Media Initiative with RadioWave.com, Press Release Newswire Association, Inc., Apr. 4, 2000, 2 pages.
"Set-top box for television that reads your mind," Financial Times, Limited, Dec. 30, 1998, 1 page.
Rajapakshe, H. et al., "Video On Demand," Jun. 1995, pp. 1-15.
Welz, G., "Integrated Streaming Technologies," Oct. 30, 1996, pp. 1-3.
ntl: Digital Radio. http://www.ntl.com/locales/qb/en/guides/dummies/produce.asp.
Bower (1998). "Digital Radio—A Revolution for In-Car Entertainment" *Proc. NavPos Automative '98 Conf.* 2(5-8): 40-51.
Deutsche Telekom AG: Digital Radio, http://www.telekom.de/dtag/ipl1/cda/level3_a/0,3680,10077.00.html.
The Eureka 147 Consortium, "Digital Audio Broadcasting" http://www.eurekadab.org/eureka_147_consortium.htm.
Radio Authority (1999), Digital Radio Fact Sheet No. 4 http://www.radioauthority.org.uk/Information/Fact_Sheets/fs4.htm.
ICTV (2000). Digital Broadband System Press Release: 1-11.
Reply to Office Action filed in U.S. Appl. No. 11/599,274 on Jun. 12, 2008, 12 pages.
Office Action issued on Jan. 18, 2008 in U.S. Appl. No. 11/599,274, 10 pages.
Reply to Office Action filed in U.S. Appl. No. 10/976,899 on Jun. 9, 2008, 13 pages.
Office Action issued on Mar. 7, 2008 in U.S. Appl. No. 10/976,899, 8 pages.
Notice of Allowability issued on Aug. 16, 2006 in U.S. Appl. No. 10/383,422, 1 page.
Office Action issued on May 19, 2006 in U.S. Appl. No. 10/383,422, 5 pages.
Office Action issued on Nov. 28, 2005 in U.S. Appl. No. 10/383,422, 8 pages.
Notice of Allowability issued on Jun. 25, 2007 in U.S. Appl. No. 10/339,425, 6 pages.
Interview Summary issued on Jul. 6, 2007 in U.S Appl. No. 10/339,425, 2 pages.
Advisory Action issued on May 30, 2007 in U.S. Appl. No. 10/339,425, 3 pages.
Office Action issued on Mar. 13, 2007 in U.S. Appl. No. 10/339,425, 13 pages.
Office Action issued on Aug. 29, 2006 in U.S. Appl. No. 10/339,425, 19 pages.
Information Disclosure Statement filed in U.S. Appl. No. 10/066,793 on Dec. 28, 2006, 3 pages.

\* cited by examiner

SYSTEM AND METHOD FOR PROVIDING AN INTERACTIVE, VISUAL COMPLEMENT TO AN AUDIO PROGRAM

CROSS-REFERENCE TO RELATED APPLICATIONS

This application is a continuation of application Ser. No. 14/314,379, filed on Jun. 25, 2014 (status pending), which is a continuation of application Ser. No. 13/082,791, filed on Apr. 8, 2011 (now U.S. Pat. No. 8,769,602), which is a continuation of application Ser. No. 11/837,772, filed on Aug. 13, 2007 (now U.S. Pat. No. 7,926,085), which is a continuation of application Ser. No. 10/066,793, filed on Feb. 6, 2002 (now U.S. Pat. No. 7,275,256), which claims the benefit of provisional application No. 60/315,046, filed on Aug. 28, 2001. The above identified applications and patents are incorporated by reference herein.

BACKGROUND OF THE INVENTION

1. Field of the Invention

The present invention is generally related to audio services, and, more specifically, provides an interactive, visual complement to one or more audio programs.

2. Discussion of the Background

Presently, there exist systems that broadcast music via satellite and cable to consumers' televisions or set-top boxes or other broadcast receiving devices. Within such a system, a consumer has typically a selection of 45 music channels to choose from. The channels comprise a variety of music genres and formats. Conventionally, for each of the available music channels, the system broadcasts audio only or, at most, a few lines of text in addition to the audio. This additional text is displayed on the consumer's TV screen. On any given channel, the text typically includes information about the music that is currently playing on that channel, such as the name of the artist, the title of the song, and the title of an album that contains the song.

Because only a few lines of text, at most, are transmitted with the audio, a consumer who tunes his or her TV or set-top box to one of the music channels sees an almost entirely blank TV screen. Thus, in conventional broadcast music systems, the TV screen is underutilized and the consumer's overall enjoyment of the system is limited.

What is desired, therefore, is a system to overcome this and other disadvantages of conventional music systems.

SUMMARY OF THE INVENTION

The present invention overcomes the above described disadvantage by providing a system and method for providing a visual complement to one or more audio programs. In one aspect, the system includes an audio subsystem for selecting a sound recording based on a playlist, generating an audio signal corresponding to the sound recording, and transmitting triggers to a video subsystem whenever a sound recording is selected. Upon receiving a trigger from the audio subsystem, the video subsystem generates a video image specification based, at least in part, on the selected sound recording. The audio signal and video image specification are transmitted to an audio/video signal transmission system. The transmission system receives the video image specification and generates a video image that conforms to the video image specification. The transmission system then transmits the video image and the audio signal to consumers' audio/video receivers so that the audio signal and video image may be perceived by the consumers. In this way, the system provides a visual complement to an audio service.

In one embodiment, the audio/video signal transmission system is a broadcast transmission system that broadcasts the video image and the audio signal to the consumers' audio/video receivers.

Advantageously, the invention may also provide an interactive, visual complement to the audio program. In this embodiment, the transmission system adds one or more selectable, interactive buttons to the video image depending on information received from the video subsystem.

In another aspect, the system also includes a video image generator coupled to the video subsystem. In this aspect, the video image specification generated by the video subsystem in response to the trigger received from the audio subsystem is provided to the video image generator. The video image generator then generates a video image based on the provided video image specification and transmits the video image to a first transmission subsystem. At the same time this is occurring, audio subsystem transmits the audio signal corresponding to the selected sound recording to the first transmission subsystem. The first transmission subsystem then transmits the audio signal together with the video image to a second transmission system, which then transmits the audio signal and video image to the consumers' receivers so that when a consumer tunes his receiver to the particular channel the consumer will be able to hear the sound recording and view the video image.

Advantageously, the video image is updated at various times so that the video image seen by the consumer changes over time as well as changing whenever a new sound recording is selected and played by the audio subsystem.

In one particular aspect, the video subsystem generates an HTML document that contains the video image specification and provides the HTML document to the video image generator. The video image generator uses the HTML document to generate an MPEG video presentation.

In another aspect, the video images are pre-generated. The pre-generated video images may be stored at the audio/video system or at the transmission system. Advantageously, a data structure is used to associate a set of one or more of the pre-generated video images with one or more sound recordings from a playlist.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
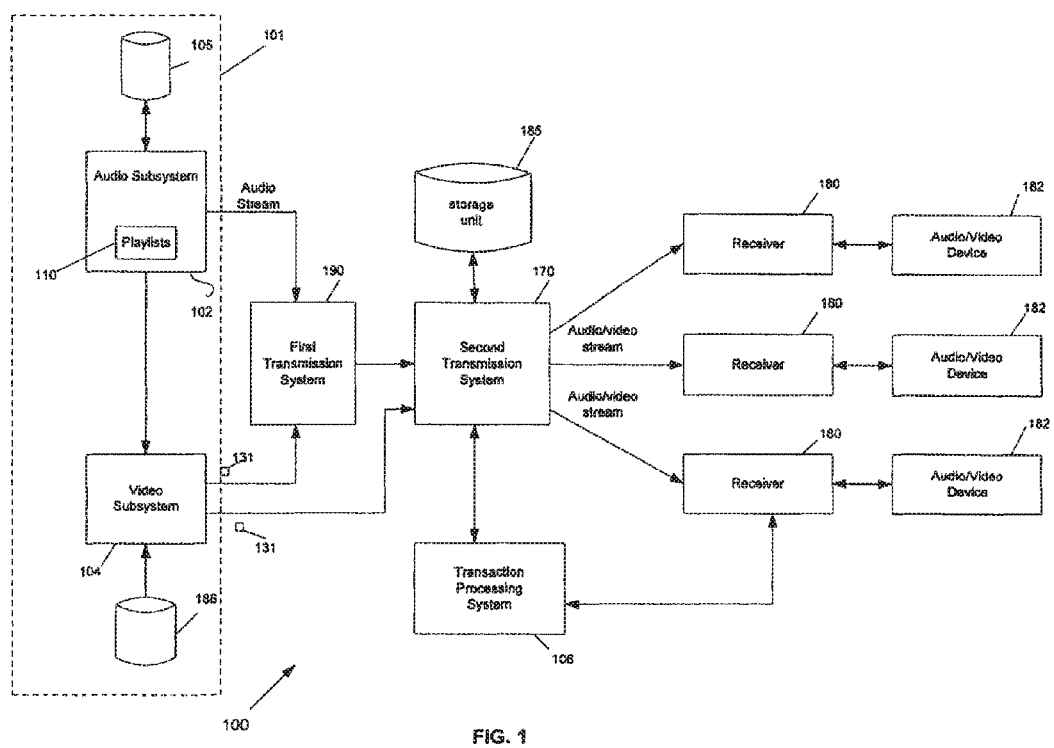
FIG. 1 is a block diagram of one embodiment of an audio/video system for providing audio/video programming to consumers.

FIG. 1 is a block diagram of one embodiment of a system 100 for providing audio/video programming. System 100 includes an audio/video system 101 comprising an audio subsystem 102 that provides audio content for transmission to listeners over one or more channels and a video subsystem 104 for providing video content that is transmitted together with the audio content and that complements the audio content. System 100 further includes a transaction processing subsystem 106 for processing transactions, such as electronic commerce ("e-commerce") transactions.

Audio/video system 101 may comprise a data processing system, a persistent storage device, and volatile memory. Stored in the storage device and/or the volatile memory are computer instructions (i.e., software) that enable audio/video system 101 to perform the functions and processes described herein. Audio subsystem 102 and video subsystem 104 may be implemented in software or a combination of software and hardware.

Audio subsystem 102 has access to a sound recording library 105 that includes a large number of sound recordings (e.g., tracks from albums of many different genres). The sound recordings may be stored on compact discs, hard disks, or other media for storing data.

Audio subsystem 102 preferably includes a playlist 110 for each of the one or more channels supported by system 100. A playlist 110 for a particular channel specifies sound recordings that have been programmed for transmission to the listeners of system 100 over that channel during a given period of time. A new playlist 110 is typically generated for each channel on some periodic basis (e.g., daily, weekly, etc.).

Audio subsystem 102 typically retrieves, encodes, and streams the sound recordings to consumers in the order in which the sound recordings are listed in the playlists 110. Preferably, the sound recordings are encoded by audio subsystem 102 according to the Dolby AC-3 coding technique.

Audio subsystem 102 may stream the encoded sound recordings to a transmission subsystem 190, which may transmit the encoded sound recordings to an audio/video signal transmission system 170. Transmission system 170 may be a broadcast transmission system, such as a cable head-end or a direct broadcast satellite system. Transmission system 170 comprises a transmitter (not shown) for transmitting signals and a computer (not shown) programmed to perform processes described herein.

Transmission system 170 transmits the encoded sound recordings to audio/video receivers 180, which are coupled to an audio/video device 182 that reproduces the sound recordings for the subscribers. Receivers 180 may be conventional digital cable or satellite set-top boxes. Audio/video device 182 may comprise a TV screen or monitor and speakers.

Video subsystem 104, in one embodiment, is responsible for, among other things, generating, in real time, data packets for each of the one or more channels. A data packet for a particular channel comprises a video image specification that specifies a visual complement of the audio service for the particular channel. Thus, the video image specification defines how the listeners' TV screens will look when the listener tunes to the particular channel.

More specifically, the video image specification specifies one or more visual media asset identifiers, each of which identify one or more visual media assets. The video image specification may also specify the screen position where each identified asset is to be displayed. Examples of video media assets include: graphic image files (e.g., GIF files, JPEG files, bitmap files, etc.), video files (e.g., MPEG files, AVI files), text messages, etc. It is these assets that are used to create the visual complement to the audio service.

Figure 2:
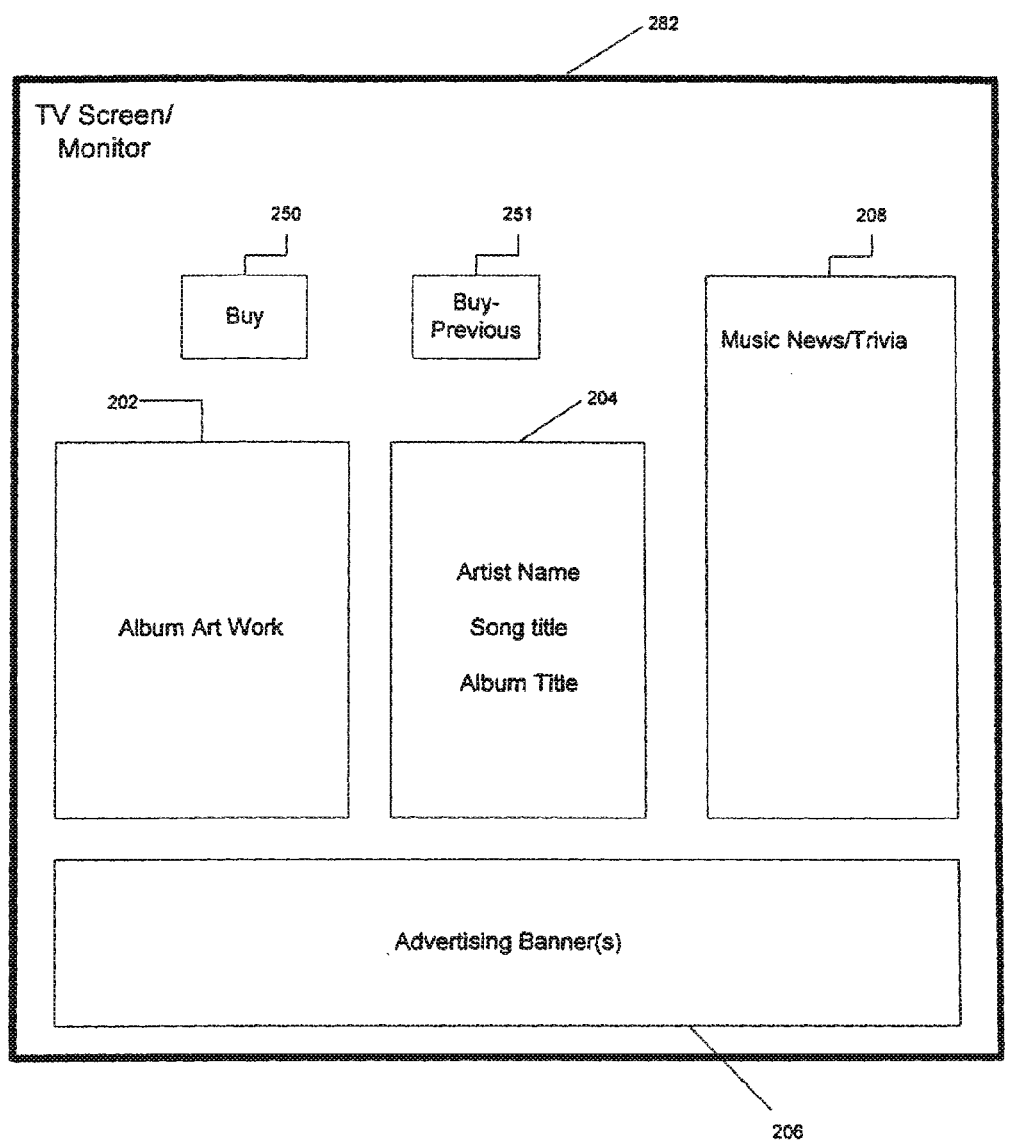
FIG. 2 illustrates various locations on a TV screen where visual media assets may be displayed.

The video image specification for a particular channel is based, at least in part, on the sound recording that the particular channel is currently playing. Therefore, for example, if a U2 song from the Joshua Tree album is currently being played on channel 51, then, at some particular point in time while the song is playing, the video image specification for channel 51 might specify that an image of the Joshua Tree album art is to be displayed at a first location 202 (see FIG. 2) on a TV screen (or monitor) 282.

Additionally, the video image specification may also specify that the name of the song, artist, and album is to be displayed at a second location 204 on the TV screen 282, and an advertising banner is to be displayed at a third location 206 on the TV screen 282.

In one embodiment, the video image specification may also specify that certain music trivia and/or news is to be displayed at a fourth location 208 on the TV screen 282. It should be understood that album art, advertising banners, text messages, and other visual media assets may be positioned anywhere on the TV screen 282 and that the invention is not limited to the particular arrangement of visual media assets shown in FIG. 2.

The video image specification may also be time driven. That is, at least some of the assets (e.g., advertising banners, music trivia, and news) specified by the video image specification are determined as function of time, regardless of which sound recording is currently playing.

Preferably, each video image specification for a particular channel includes an asset identifier that identifies a text message that contains information pertaining to the sound recording that is currently being played over the particular channel. This information may include the name of the artist who created the sound recording, the title of the sound recording, and the name of an album on which the sound recording can be found. Alternatively, instead of or in addition to each video image specification for the particular channel including the asset identifier that identifies the text message, the text message itself may be included in the data packet.

In addition to including a video image specification, the data packet may further include purchase information for enabling a listener of system 100 to purchase the album or the sound recording. The purchase information may include an indicator that the sound recording or album is saleable, a price, and a unique code that identifies the album.

Figure 6:
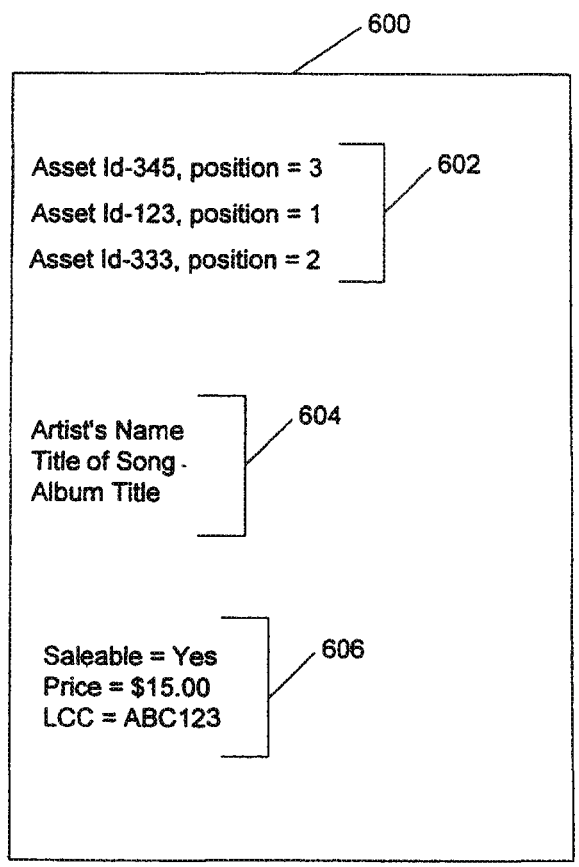
FIG. 6 illustrates an exemplary data packet.

FIG. 6 illustrates an exemplary data packet 600. As shown in FIG. 6, data packet 600 includes a video image specification 602. Optionally, data packet 600 may also include sound recording information 604, and purchase information 606. Video image specification 602 comprises a list of visual media asset identifiers and associates a screen position with each asset identifier. The data packets may be extensible mark-up language (XML) files or hyper-text mark-up language (HTML) files.

In the embodiment shown in FIG. 1, after generating a data packet for a particular channel, video subsystem 104 transmits the data packet so that it will be received by transmission system 170. Video subsystem 104 may use transmission subsystem 190 to transmit the data packet to transmission system 170 or may use a public network (e.g., the Internet) or private network to transmit the data packet to transmission system 170.

Transmission system 170 may have access to a data storage unit 185. Preferably, storage unit 185 has a very short access time. Storage unit 185 stores the visual media assets specified in the data packet (storage unit 185 is updated periodically by an administrator to ensure that storage unit 185 contains the necessary visual media assets). Therefore, borrowing from the above example, storage unit 185 stores the image of the Joshua Tree album art that is displayed when the song from U2's Joshua Tree album is playing.

In embodiments where transmission system 170 does not have access to storage unit 185, a storage unit 186 that is coupled to video subsystem 104 stores the visual media assets specified in the video image specification, and video subsystem 104 retrieves the assets from storage 186 and transmits them to transmission system 170.

After receiving the data packet for the particular channel, transmission system 170 parses the data packet and determines the video image specification and purchase information that are specified therein. Transmission system 170 then creates a video image corresponding to the video image specification and transmits the video image over the particular channel to subscribers' audio/video receivers 180. The video image is then displayed by audio/video device 182.

The video image conforms to the video image specification contained in the data packet so that when the video image is displayed on the subscribers' audio/video device 182, the visual media assets defined in the video image specification are displayed in the locations as specified in the video image specification.

The video image may be encoded according to a Moving Pictures Experts Group (MPEG) standard, the National Television Standards Committee (NTSC) video signal standard, or other video signal standard. In one specific embodiment, the video image is encoded according to an MPEG standard and comprises an MPEG I-frame followed by null P-frames.

Figure 3A:
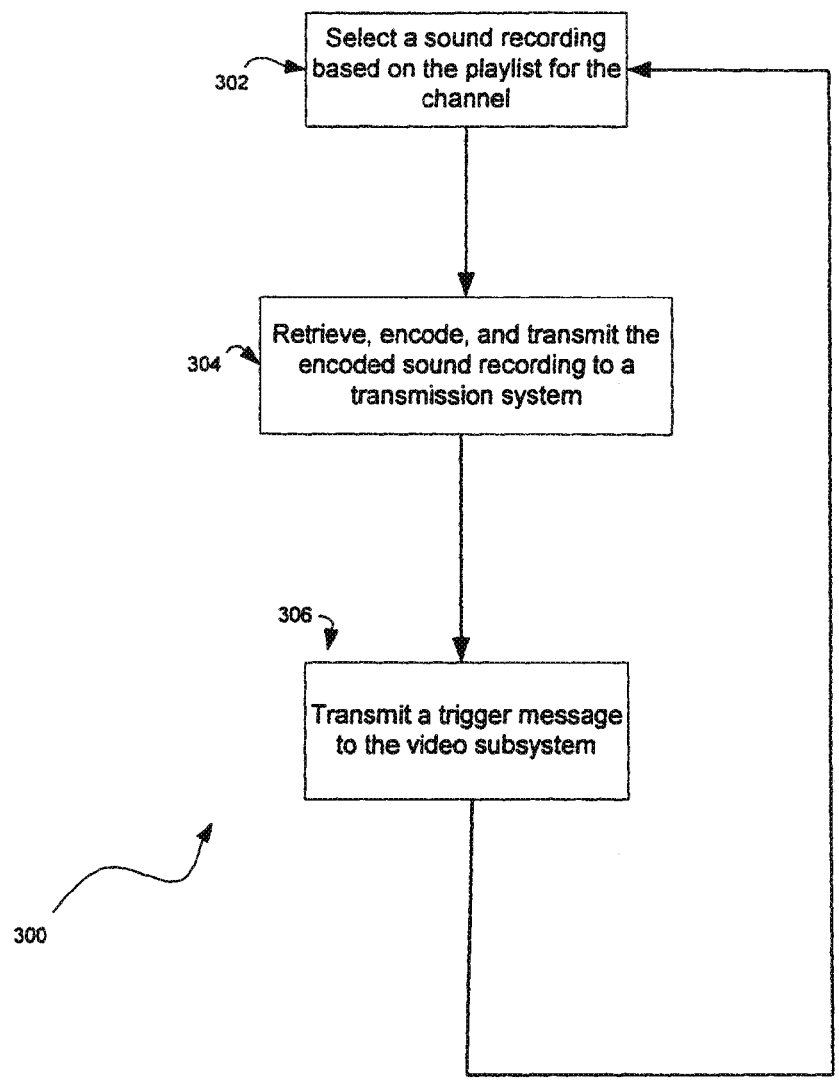
FIGS. 3A-3C are flow charts illustrating processes, according to one embodiment, performed by the audio subsystem, the video subsystem, and the audio/video signal transmission system, respectively, for providing an interactive, visual complement to an audio program for a particular channel.
Figure 3B:
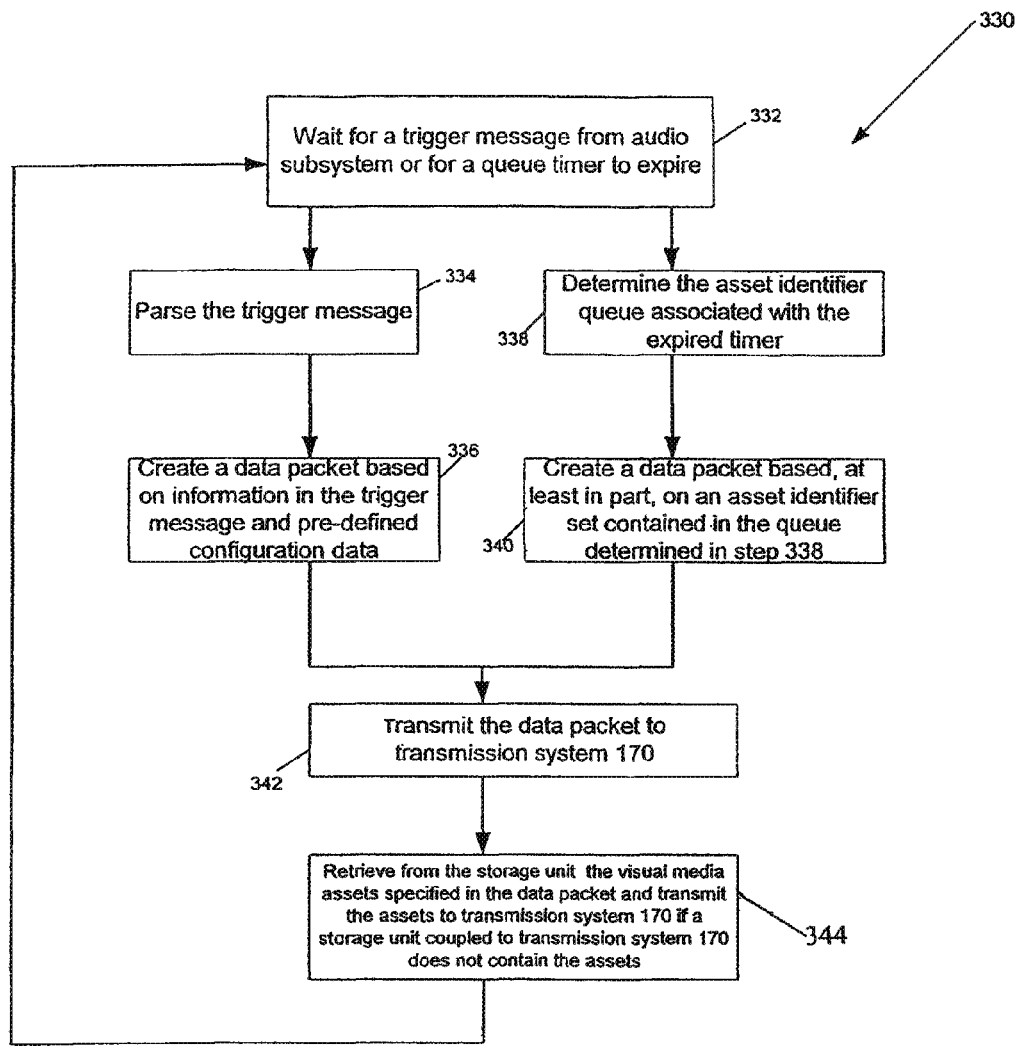
Figure 3C:
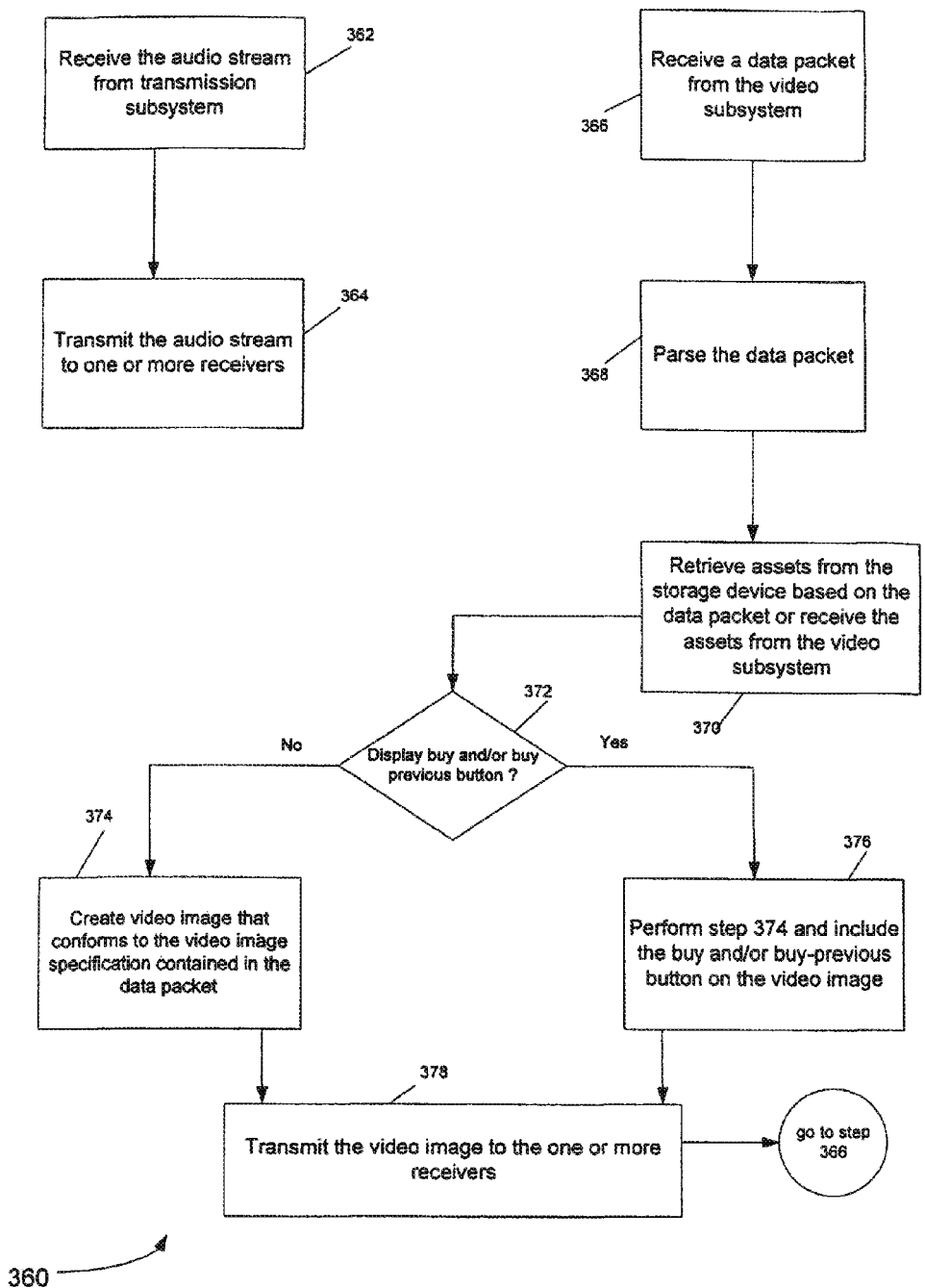

FIGS. 3A-3C are flow charts illustrating processes 300, 330, and 360, according to one embodiment, performed by audio subsystem 102, video subsystem 104, and transmission system 170 respectively, for providing an interactive, visual complement to the audio service for a particular channel. The same process is performed for the other channels.

Process 300 (see FIG. 3A) begins in step 302, where audio subsystem 102 selects a sound recording from library 105 based on a playlist for the particular channel. After selecting the sound recording, audio subsystem 102 retrieves it from library 105, encodes it, and transmits it to transmission subsystem 190 (step 304), which then transmits it to a system, such as, for example, a transmission system 170, that transmit audio/video signals to the subscribers' receivers 180.

At or about the same time as step 304 is performed, audio subsystem 102 transmits to video subsystem 104 a trigger message specifying a sound recording identifier that identifies the sound recording selected in step 302, sound recording information pertaining to the sound recording, and a channel identifier (step 306). The sound recording identifier uniquely identifies the sound recording selected in step 302 and the channel identifier uniquely identifies the particular channel. After audio subsystem 102 finishes transmitting the sound recording selected in step 302, control passes back to step 302, where audio subsystem 102 selects another sound recording from library 105 based on the playlist for the particular channel after it has finished streaming the previously selected sound recording for that channel.

Process 330 (see FIG. 3B) begins in step 332, where video subsystem 104 waits for a trigger message from audio subsystem 102 or for a timer to expire. If video subsystem 104 receives a trigger message from audio subsystem 102, control passes to step 334, and if a timer expires, control passes to step 338.

In step 334, video subsystem 104 parses the trigger message to determine the sound recording identifier, sound recording information, and channel identifier specified therein. Next (step 336), video subsystem 104 uses this information, together with pre-defined configuration data that is associated with the channel identified by the channel identifier, to create a data packet for the identified channel. The predefined configuration data is stored in video subsystem 104. An illustration of pre-defined configuration data is shown in FIG. 4, and will be discussed in more detail further below.

Figure 4:
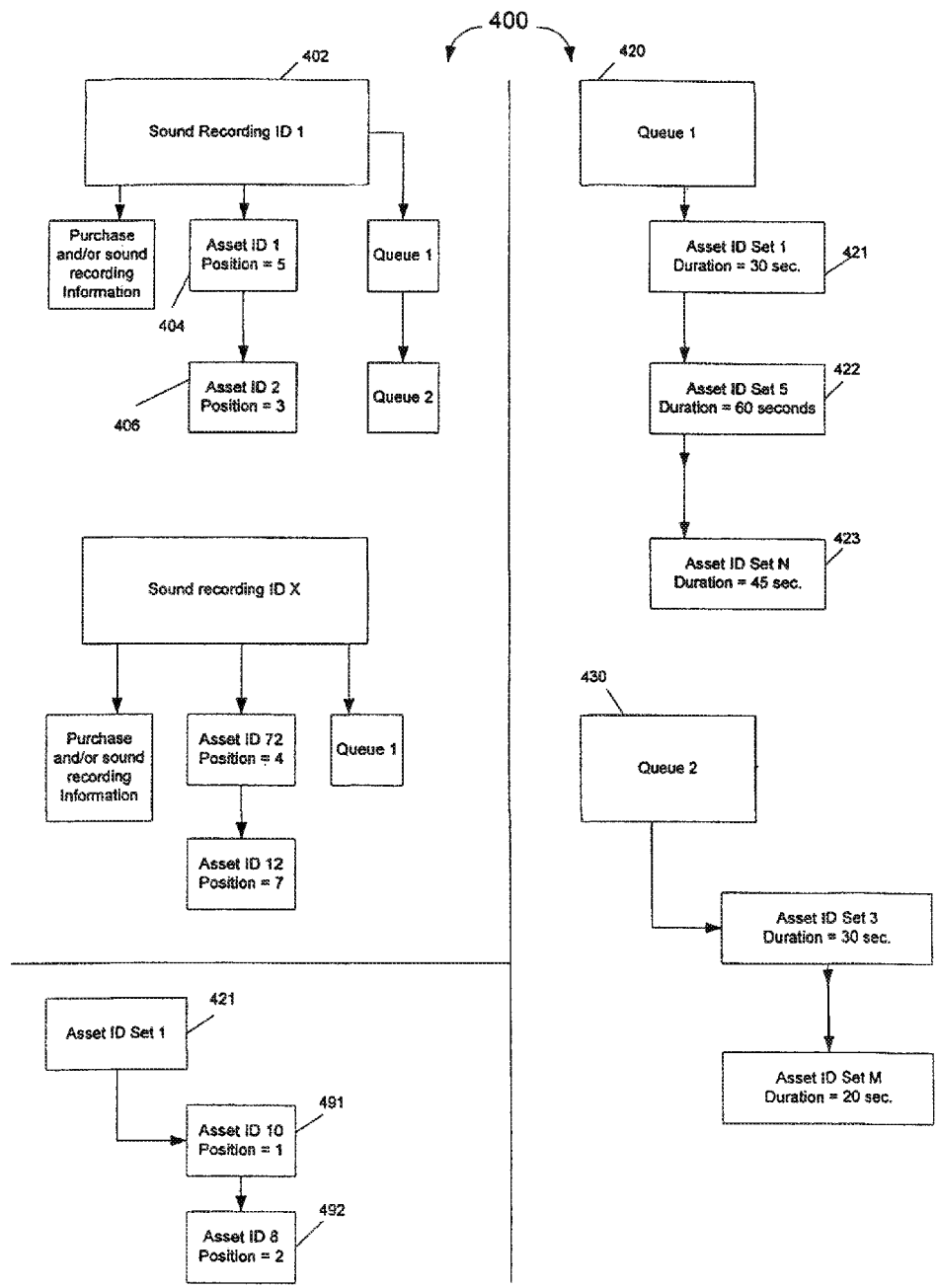
FIG. 4 illustrates pre-defined configuration data that is associated with a particular channel and that is used by the video subsystem to create data packets for the particular channel.

In step 338, video subsystem 104 determines a channel and an asset identifier queue that is associated with the expired timer (see element 420 of FIG. 4 for an illustration of an exemplary queue). Next (step 340), video subsystem 104 may create a data packet for the identified channel based, at least in part, on the contents of the asset identifier queue associated with the expired timer. An illustration of a process 500 for creating a data packet is shown in FIG. 5, and will be discussed in more detail further below.

After creating the data packet in either step 336 or 340, video subsystem 104 transmits the data packet to audio/video transmission system 170 (step 342). After step 342, control passes back to step 344. In step 344, video subsystem retrieves from a storage unit 186 the visual media assets specified in the data packet and transmits the assets to transmission system 170 if storage unit 185 does not contain the assets.

Process 360 (see FIG. 3C) begins in step 362. In step 362, audio/video signal transmission system 170 receives from transmission subsystem 190 the audio stream transmitted by audio subsystem 102. Next (step 364), transmission system 170 transmits the audio stream to receivers 180.

While transmission system 170 is receiving and transmitting the audio stream, transmission system 170 receives from video subsystem 104 a data packet for the particular channel (step 366). After receiving the data packet for the particular channel, transmission system 170 parses the data packet and determines the video image specification and purchase information (if any) specified therein (step 368). That is, transmission system 170 determines the set of asset identifiers specified by the video image specification and the screen position associated with each asset identifier, which may also be specified by the video image specification.

Next (step 370), transmission system 170 retrieves from storage unit 185 the assets identified by the asset identifiers determined in step 368, but if storage unit 185 does not have the assets, then transmission system 170 receives them from video subsystem 104, as described above.

Next (step 372), transmission system 170 determines whether the purchase information indicates that a "Buy" button 250 and/or "Buy-Previous" button 251 should be included in of the video image transmitted to receivers 180. Buy button 250 and Buy-Previous button 251 are interactive, selectable buttons that a user of system 100 may select if the user desires to make a purchase.

If it is determined that Buy button 250 and/or Buy-Previous button 251 should be included in the video image transmitted to receivers 180, then control passes to step 374, otherwise control passes to step 376.

In step 374, transmission system 170 uses the assets retrieved in step 370 and screen position information determined in step 368 to create a video image that conforms to the video image specification contained in the data packet. In step 376, transmission system 170 performs the same step as in step 374, but also adds Buy button 250 and/or Buy-Previous button 251 to the video image. After step 374 and step 376, control passes to step 378. In step 378, the video image created in step 374 or 376 is transmitted to receivers 180. After step 378, control passes back to step 366.

Alternatively, transmission system 170 does not perform step 376. Rather, if it is determined that Buy button 250 and/or Buy-Previous button 251 should be included in the video image created in step 372, then transmission system 170 sends one or more commands to receivers 180 that direct the receivers 180 to overlay Buy button 250 and or Buy-Previous button 251 onto the vide image transmitted in step 378, provided that receivers 180 are capable of overlying selectable buttons.

A listener who desires to purchase a saleable item may select the Buy 250 or Buy-Previous 251 button to initiate a conventional e-commerce transaction with transaction processing system 106. The listener may select the Buy or Buy-Previous button by, for example, selecting a pre-defined button on a remote control (not shown) that communicates with a receiver 180.

In response to the listener selecting a button 250 or 251, a user interface screen is presented on audio/video device 182. The screen provides information regarding the product (i.e., the album or song currently playing), such as purchase price. If the listener decides to purchase the product, the listener may, for example, select another pre-defined button on the remote control. This will cause a message to be sent from the listener's receiver 180 to transaction processing system 106. The message indicates that the listener desires to purchase the product and may contain an identifier that identifies the product and an identifier that identifies the listener or a registered user account. The receiver may directly send the message to the system 106 through a network, such as the Internet, or may send the message to transmission system 170, which then relays the message to system 106. Upon receiving the message, transaction processing system 106 process the purchase transaction and/or communicates with a vendor who provides the product.

Referring now to FIG. 4, FIG. 4 illustrates pre-defined configuration data 400 that is associated with a particular channel and that is used by video subsystem 104 to create data packets for the particular channel. As shown in FIG. 4, the pre-defined configuration data 400 associates visual media asset identifiers with sound recording identifiers. Each asset identifier uniquely identifies a visual media asset. Thus, configuration data 400 associates visual media assets with a sound recordings.

Preferably, the visual media assets associated with a sound recording are to be displayed during the entire time the sound recording is being played. For example, as shown in FIG. 4, sound recording identifier 402 is associated with asset identifiers 404 and 406. Thus, when system 100 plays the sound recording identified by sound recording identifier 402, the assets identified by asset identifiers 404 and 406 should be displayed to the listeners. Preferably, the configuration data associates a position with each visual media asset. For example, assets 404 and 406 are associated with positions 5 and 3 respectively.

The configuration data may also specify one or more asset queues. An asset queue is an ordered list of asset identifier sets. An asset identifier set contains one or more asset identifiers and a screen position for each asset identifier. Preferably, a time duration is associated with each asset identifier set in a queue. For example, the exemplary configuration data 400 illustrated in FIG. 4, specifies two asset queues: queue 420 and 430. Queue 420, for example, contains asset sets 421-423, and assets 421-423 are associated with a time duration of 30 seconds, 60 seconds, and 45 seconds, respectively. As an example, asset identifier set 421 contains asset identifiers 491 and 492, where asset identifier 491 is associated with screen position 1 and asset identifier 492 is associated with screen position 2.

In addition to associating a sound recording identifier with certain asset identifiers, the configuration data may also associate a sound recording identifier with one or more of the asset identifier queues. For example, as shown in FIG. 4, sound recording 402 is associated with asset identifier queue 420 and 430. Because asset sets 421-423 are listed in queue 420 and because queue 420 is associated with sound recording 402, assets identified by asset identifier sets 421-423 are displayed sequentially for the specified duration of times while sound recording 402 is being played. That is, while sound recording 402 is being played, the assets identified by asset identifier set 421 are displayed for its specified duration (i.e., 30 seconds), followed by the assets identified by asset identifier set 422 for its specified duration (i.e., 60 seconds), and then followed by the assets identified by asset identifier set 423 for its specified duration (i.e., 45 seconds).

Figure 5A:
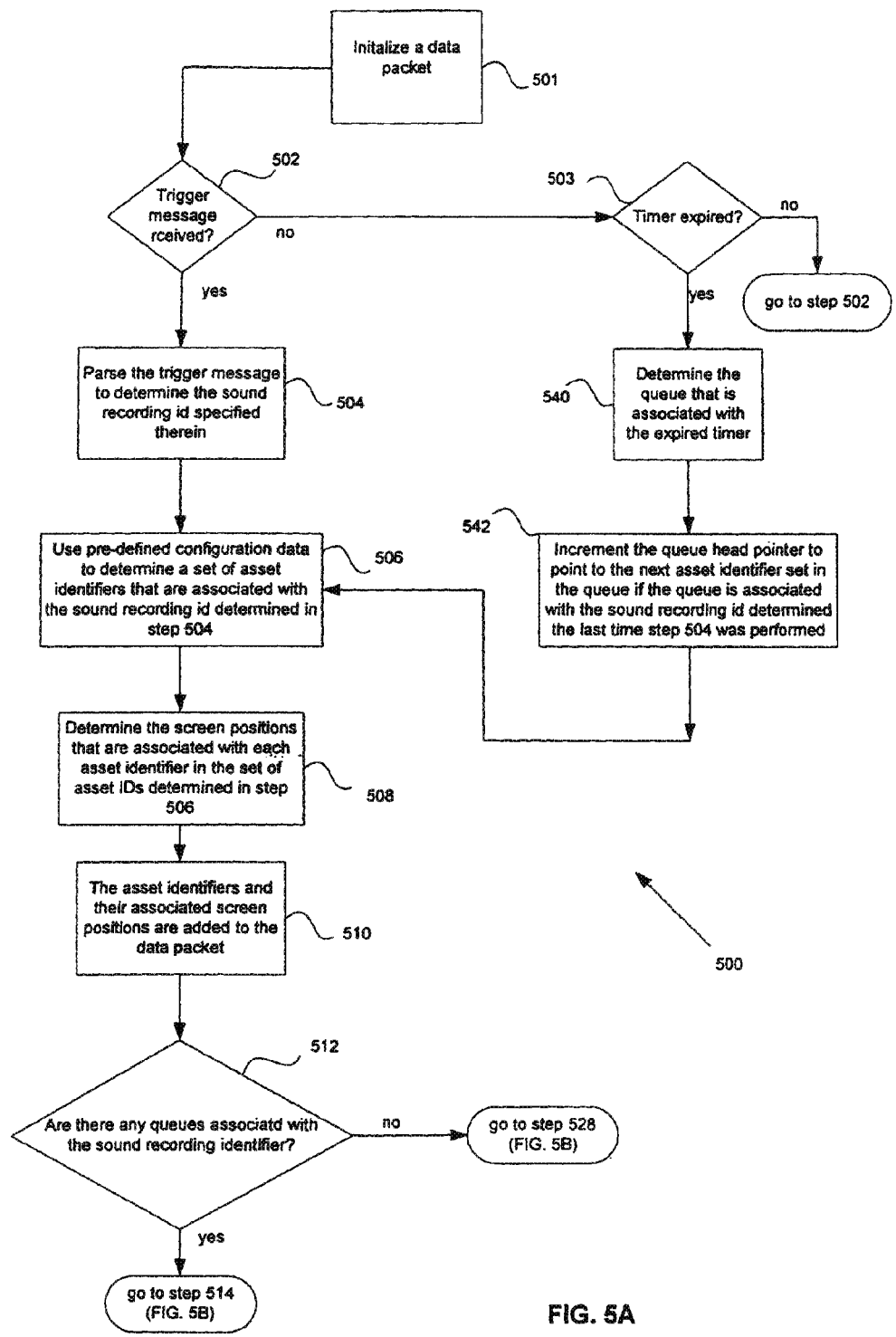
FIGS. 5A and 5B is a flow chart illustrating a process, according to one embodiment, for creating a data packet for a particular channel.
Figure 5B:
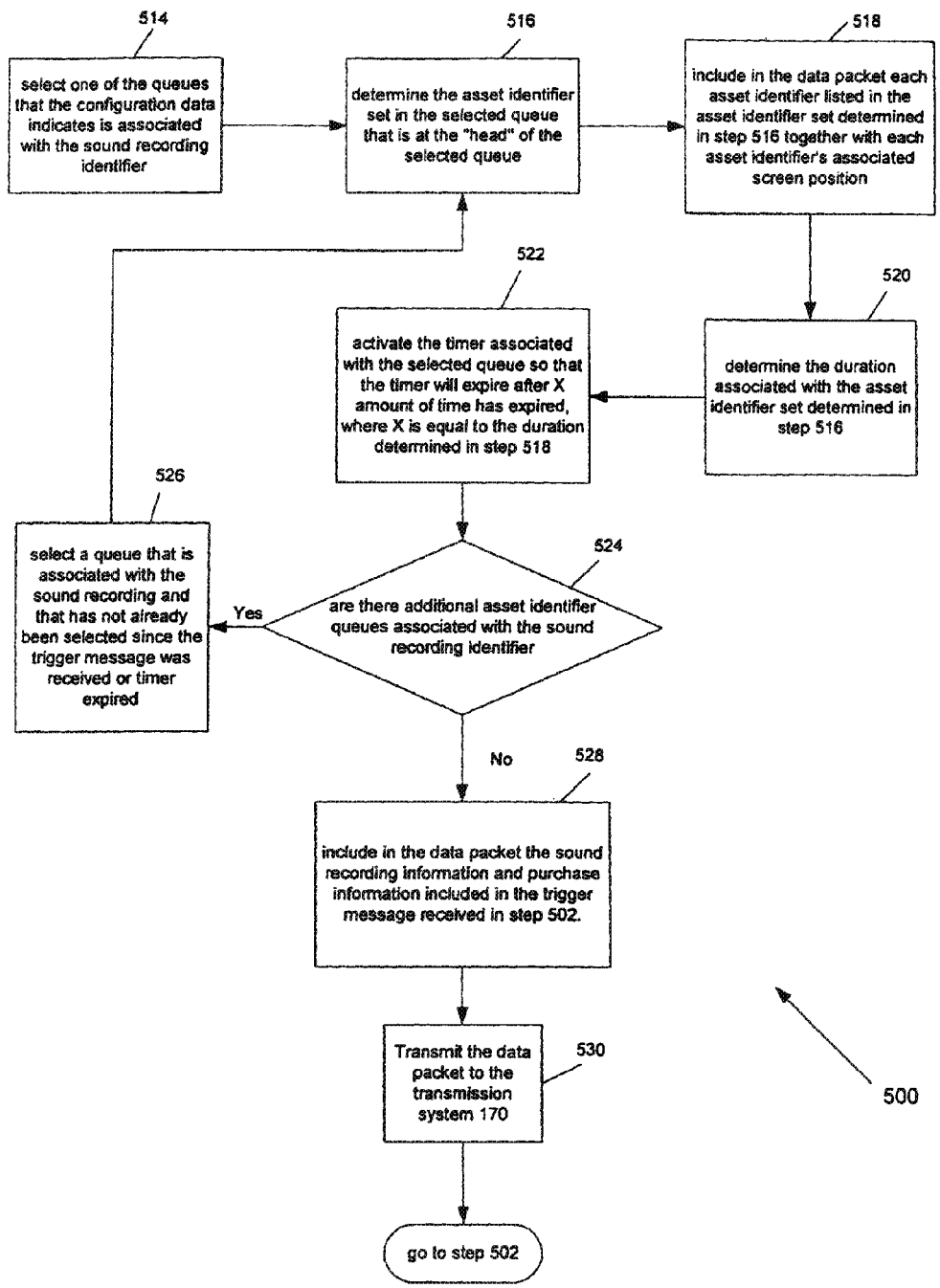

Referring now to FIGS. 5A and 5B, FIGS. 5A and 5B is a flow chart illustrating a process 500, according to one embodiment, for creating a data packet for a particular channel. Process 500 begins in step 501 wherein video subsystem 104 initializes a data packet so that it does not contain any data. Next (step 502), video subsystem 104 determines whether a trigger message from audio subsystem has been received. If a trigger message is received, control passes to step 504, otherwise control passes to step 503. In step 503, video subsystem 104 determines whether an asset queue timer has expired. If an asset queue timer expires, control passes to step 540, otherwise control passes back to step 502.

In step 504, video subsystem 104 parses the trigger message to determine the sound recording identifier, sound recording information, and channel identifier specified therein. Next (step 506), video subsystem 104, uses the pre-defined configuration data to determine a set of assets identifiers that are associated with the sound recording identifier last determined in step 504. Video subsystem 104 then determines the screen position that is associated with each asset identifier in the set (step 508). The asset identifiers determined in step 506 and their associated screen positions determined in step 509 are included in the data packet (step 510).

Next (step 512), video subsystem 104 uses the pre-defined configuration data to determine whether there are any asset identifier queues associated with the sound recording identifier determined in step 504. If there are, control passes to step 514, otherwise control passes to step 528.

In step 514, video subsystem 104 selects one of the queues that the configuration data indicates is associated with the sound recording identifier. Next (step 516), video subsystem determines the asset identifier set in the selected queue that is at the "head" of the selected queue. In one embodiment, video subsystem 104 maintains a head pointer for each queue specified by the configuration data. The head pointer for a queue points to the asset identifier set in the queue that is at the head of the queue. Thus, video subsystem 104 may use the head pointer to determine the asset identifier set in the selected queue that is at the head of the selected queue. After step 516, control passes to step 518.

In step 518, video subsystem 104 includes in the data packet each asset identifier listed in the asset identifier set determined in step 516 together with each asset identifier's associated screen position. Next (step 520), video subsystem 104 determines the duration associated with the asset identifier set determined in step 516. Next (step 522), video subsystem 104 activates the timer associated with the selected queue so that the timer will expire after X amount of time has expired, where X is equal to the duration determined in step 518. After step 522, control passes to step 524.

In step 524, video subsystem 104 determines whether there are additional asset identifier queues associated with the sound recording identifier. If there are, control passes to step 526, otherwise control passes to step 528. In step 526, video subsystem 104 selects a queue that is associated with the sound recording and that has not already been selected since the trigger message was received. After step 526, control passes back to step 516.

In step 528, video subsystem 104 includes in the data packet the sound recording information and purchase information included in the trigger message received in step 502. This information concerns the sound recording identified by the sound recording identifier determined in step 504. In one embodiment, the trigger message does not include this information, rather, this information is included in the pre-defined configuration data. More specifically, the pre-defined configuration data associates sound recording information and purchase information with each sound recording identifier included in the configuration data, as shown in FIG. 4. After step 528, control passes to step 530, where the data packet is transmitted to transmission system 170. After step 530, control passes back to step 502.

In step 540, video subsystem 104 determines the queue that is associated with the timer that expired. Next (step 542), video subsystem 104 increments the head pointer associated with the queue determined in step 540 to point to the next asset identifier set in the queue if the queue determined in step 540 is associated with the sound recording identifier determined in step 504. However, if the head pointer is pointing to the last asset identifier set in the queue, video subsystem resets the pointer to point to the asset identifier set that is at the top of the queue. In this way, the queues are circular queues. After step 542, control passes to step 506.

Figure 7:
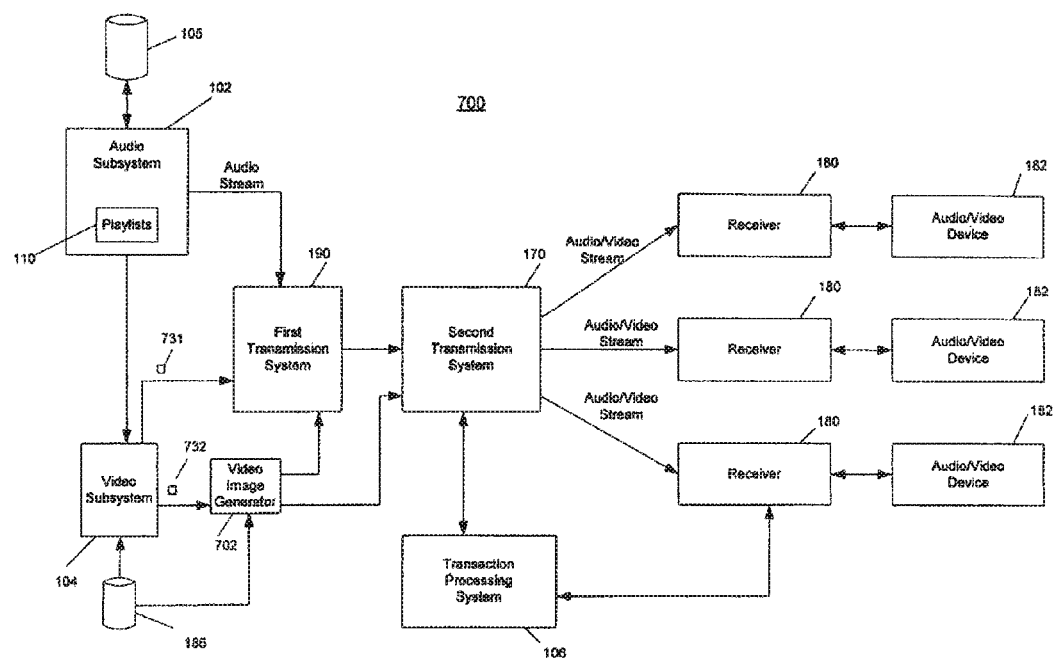
FIG. 7 is a block diagram of a system according to another embodiment of the invention.

FIG. 7 is a block diagram of a system 700 for providing audio/video programming according to another embodiment of the present invention. System 700 is identical to system 100 with the exception that system 700 further includes a video image generator 702 that is coupled to video subsystem 104. Video image generator 702 has access to storage 186, which stores the visual media assets necessary to create the visual complement to the audio service.

Additionally, instead of transmission system 170 receiving data packet 131 generated by video subsystem 104, as described above with respect to FIG. 1, video image generator 702 receives a data packet 732 generated by video subsystem 104. Data packet 732 comprises a video image specification. Further, video subsystem 104 may also generate a data packet 731 and transmits data packet 731 to transmission subsystem 190. Data packet 731 comprises purchase information and/or sound recording information corresponding to the sound recording most recently selected by audio subsystem 102.

Video image generator 702 functions to create a video image based on the video image specification contained in data packet 732. In one embodiment, after creating the video image, generator 702 transmits the video image to transmission subsystem 190. Transmission subsystem 190 functions to transmits the video image, data packet 731 (if any), and the audio stream generated by audio subsystem 102 to transmission system 170. In one embodiment, the video image, data packet 731 and audio stream are transmitted together in an MPEG-2 data stream.

Figure 8:
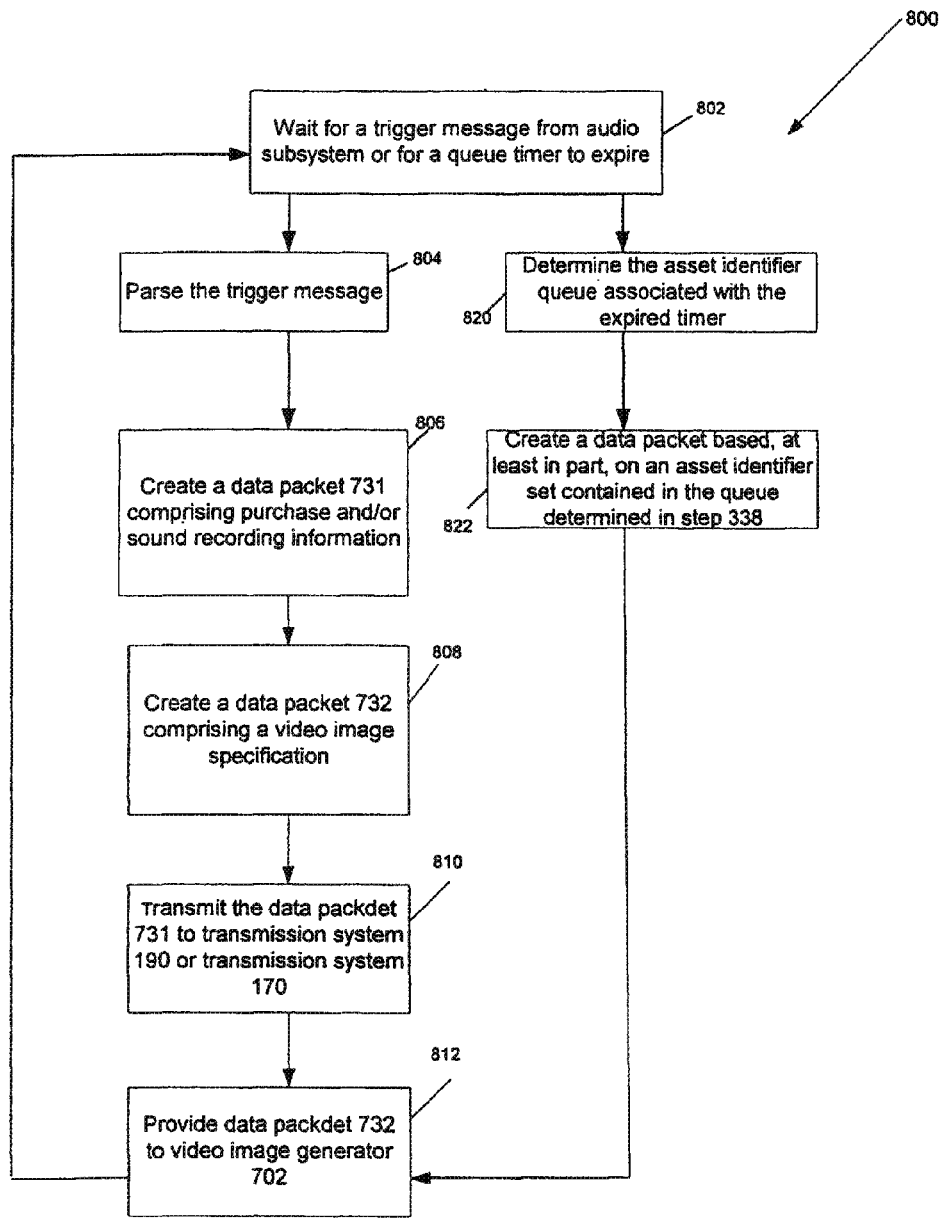
FIG. 8 is a flow chart illustrating a process, according to another embodiment, that is performed by the video subsystem.
Figure 9:
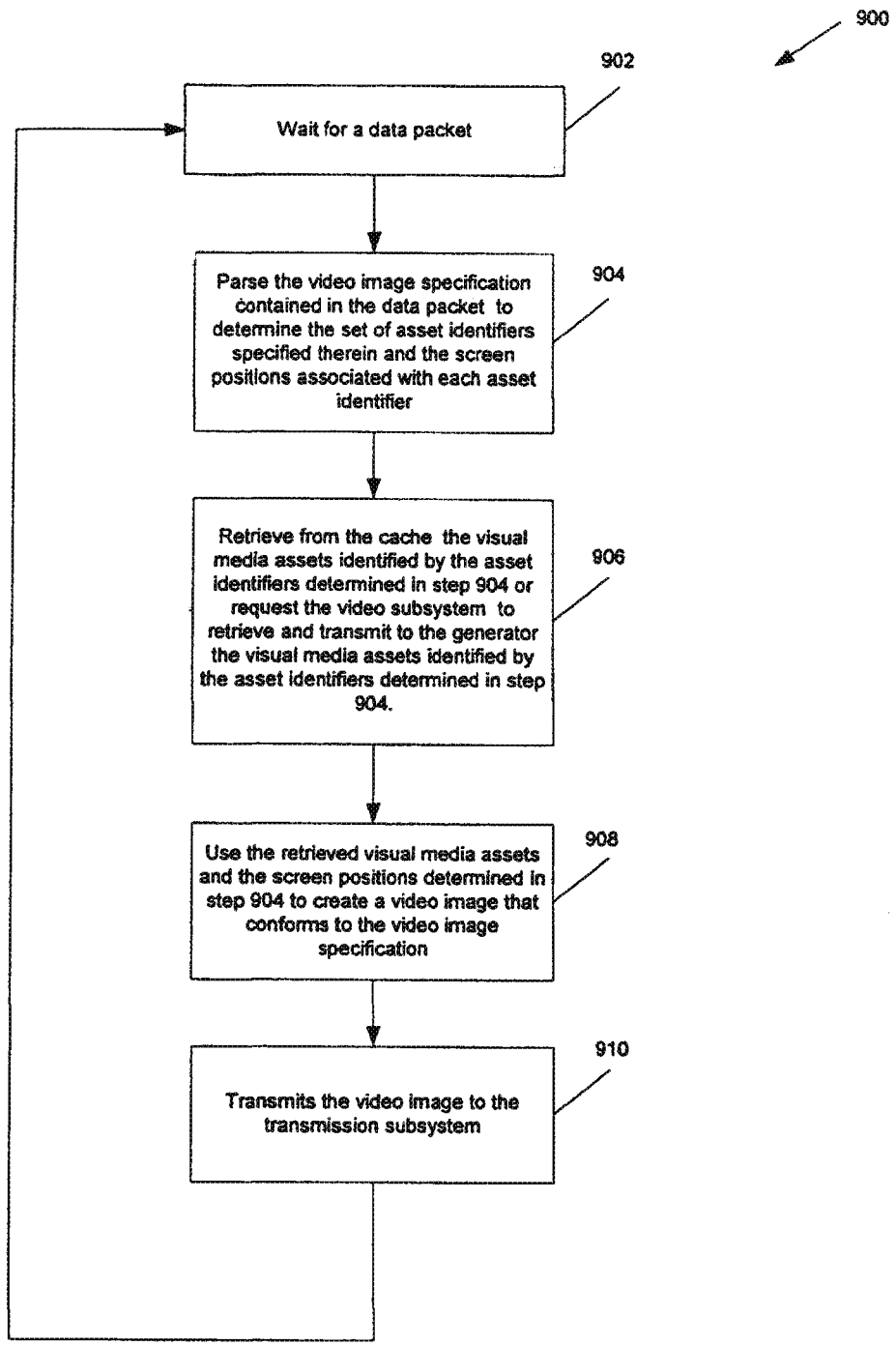
FIG. 9 is a flow chart illustrating a process, according to one embodiment, that is performed by the video image generator.

In the embodiment shown in FIG. 7, audio subsystem 102 performs process 300, as described above. However, video subsystem 104 does not perform process 330 and transmission system 170 does not perform process 360. Rather, video subsystem 104 performs process 800, which is shown in FIG. 8. Additionally, video image generator performs a process 900, which is shown in FIG. 9.

Process 800 begins in step 802, where video subsystem 104 waits for a trigger message from audio subsystem 102 or for a timer to expire. If video subsystem 104 receives a trigger message from audio subsystem 102, control passes to step 804, and if a timer expires, control passes to step 820.

In step 804, video subsystem 104 parses the trigger message to determine the sound recording identifier, sound recording information, and channel identifier specified therein. Next (step 806), video subsystem 104 uses this information, together with the pre-defined configuration data that is associated with the channel identified by the channel identifier, to create a data packet 731 for the identified channel.

Data packet 731 created in step 806 comprises purchase information and/or sound recording information. The purchase and/or sound recording information may be included in the trigger message and/or included in the pre-defined configuration data. After step 806, control passes to step 808. In step 808, video subsystem 104 uses the sound recording identifier determined in step 804 and the pre-defined configuration data to create a data packet 732. Data packet 732 comprises a video image specification (e.g., a list of visual media asset identifiers together with their associated positions). After generating data packets 731 and 732, video subsystem 104 performs steps 810 and 812. In step 810, video subsystem 104 transmits data packet 731 to transmission system 190 (or to transmission system 170). In step 812, video subsystem 104 provides data packet 732 to video image generator 702.

In step 820, video subsystem 104 determines a channel and an asset identifier queue that is associated with the expired timer. Next (step 822), video subsystem 104 creates for the identified channel a data packet 732 that comprises a video image specification. Next (step 812) data packet 732 is provided to video image generator 702. After step 812, control passes back to step 802.

Referring now to process 900, process 900 begins in step 902, where video image generator 702 waits to receive from video subsystem 104 a data packet 732, which comprises a vide image specification. When a data packet 732 is received, control passes to step 904, where video image generator 702 parses the video image specification contained in the data packet 732 to determine the set of asset identifiers specified therein and the screen positions associated with each asset identifier. After step 904, control passes to step 906.

In step 906, video image generator 702 retrieves from storage 186 the visual media assets identified by the asset identifiers determined in step 904. Alternatively, in one embodiment, video image generator 702 does not have access to storage 186, but video subsystem 104 does. In this embodiment, generator 702 requests video subsystem 104 to retrieve and transmit to generator 702 the visual media assets identified by the asset identifiers determined in step 904.

Next (step 908), video image generator 702 uses the retrieved visual media assets and the screen positions determined in step 904 to create a video image that conforms to the video image specification. Video image generator 702 then transmits the video image to transmission subsystem 190 (step 910). After step 910, control passes back to step 902.

In one embodiment, data packet 732 is an HTML document and video image generator 702 is a hardware/software device that convert the HTML document to an MPEG video presentation. In one specific embodiment, video image generator converts the HTML document into an MPEG I-frame followed by null P-frames. Such a device can be purchased from Liberate Technologies of San Carlos, Calif.

Figure 10:
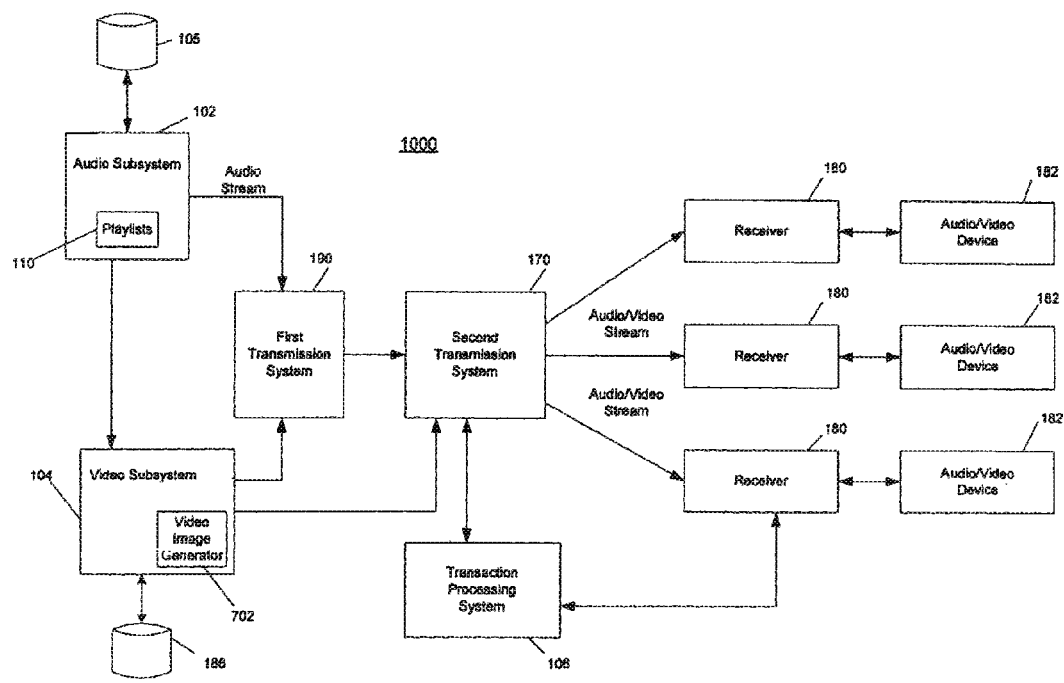
FIG. 10 is a block diagram of a system according to another embodiment of the invention.
Figure 11:
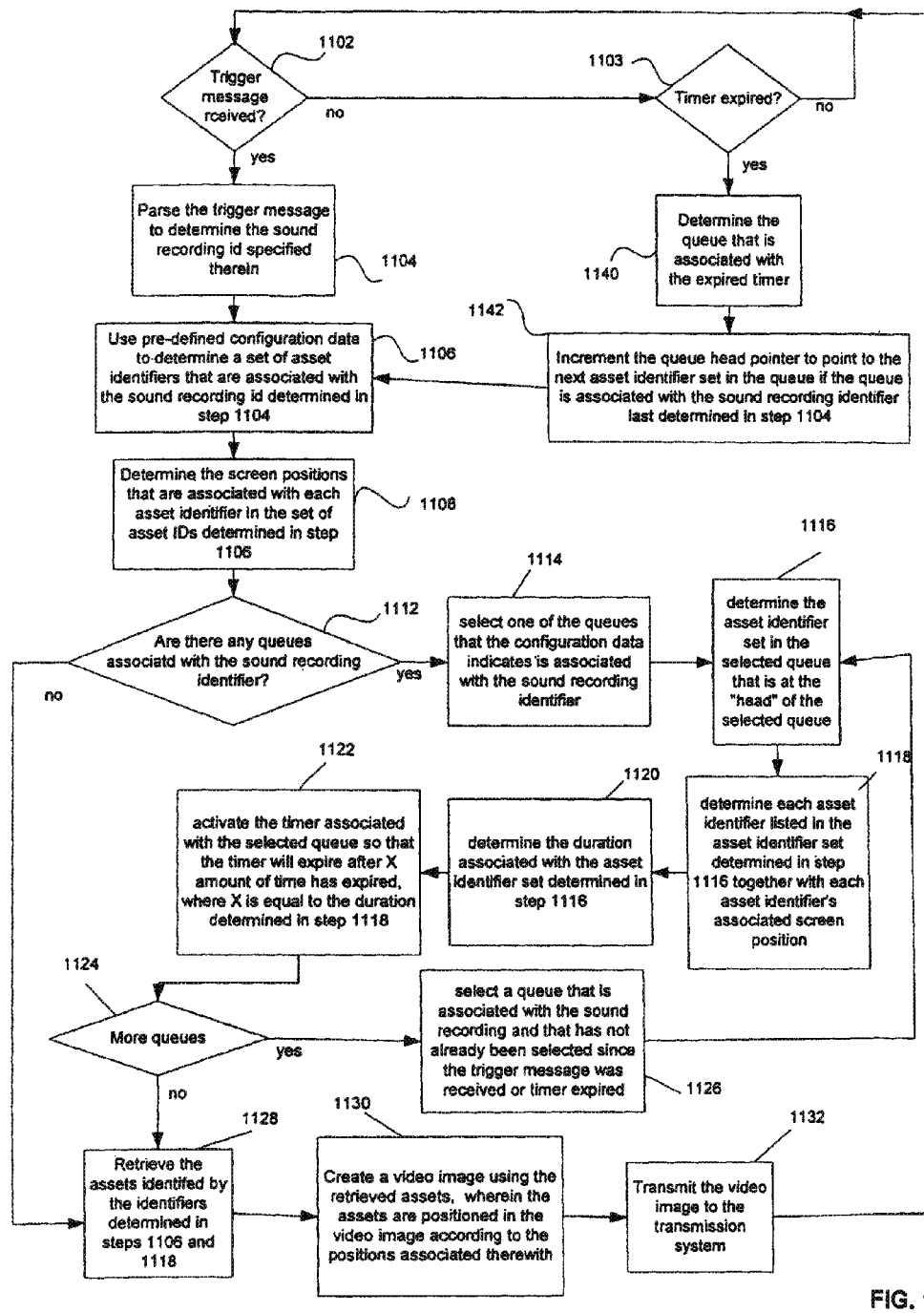
FIG. 11 is a flow chart illustrating a process, according to one embodiment, that is performed by the video subsystem.

FIG. 10 is a block diagram of a system 1000 for providing audio/video programming according to another embodiment of the present invention. System 1000 is similar to systems 100 and 700. However, in system 1000 video subsystem 104 comprises the video image generator 702, which may be implemented in hardware and/or software. In this embodiment, a data packet that comprises a video image specification, such as data packet 732, is not needed because video subsystem 104 itself creates the video images that compliment the audio service. FIG. 11 illustrates a process 1100 performed by video subsystem 104 according to the embodiment shown in FIG. 10.

Process 1100 begins in step 1102, where video subsystem 104 determines whether a trigger message from audio subsystem has been received. If a trigger message is received, control passes to step 1104, otherwise control passes to step 1103. In step 1103, video subsystem 104 determines whether an asset queue timer has expired. If an asset queue timer expires, control passes to step 1140, otherwise control passes back to step 1102.

In step 1104, video subsystem 104 parses the trigger message to determine the sound recording identifier specified therein. Next (step 1106), video subsystem 104, uses the pre-defined configuration data to determine a set of assets identifiers that are associated with the sound recording identifier determined in step 1104. Video subsystem 104 then determines the screen position that is associated with each asset identifier in the set (step 1108). Next (step 1112), video subsystem 104 uses the pre-defined configuration data to determine whether there are any asset identifier queues associated with the sound recording identifier determined in step 1104. If there are, control passes to step 1114, otherwise control passes to step 1128.

In step 1114, video subsystem 104 selects one of the queues that the configuration data indicates is associated with the sound recording identifier. Next (step 1116), video subsystem determines the asset identifier set in the selected queue that is at the "head" of the selected queue. After step 1116, control passes to step 1118.

In step 1118, video subsystem 104 determines each asset identifier listed in the asset identifier set determined in step 1116 together with each asset identifier's associated screen position. Next (step 1120), video subsystem 104 determines the duration associated with the asset identifier set determined in step 1116. Next (step 1122), video subsystem 104 activates the timer associated with the selected queue so that the timer will expire after X amount of time has expired, where X is equal to the duration determined in step 1118. After step 1122, control passes to step 1124.

In step 1124, video subsystem 104 determines whether there are additional asset identifier queues associated with the sound recording identifier. If there are, control passes to step 1126, otherwise control passes to step 1128. In step 1126, video subsystem 104 selects a queue that is associated with the sound recording and that has not already been selected. After step 1126, control passes back to step 1116.

In step 1128, video subsystem 104 retrieves the assets identified by the asset identifiers determined in steps 1106 and 1118. Next (step 1130), video subsystem 104 creates a video image using the retrieved assets, wherein each asset is positioned in the video image according its associated position. After step 1130, control passes to step 1130, where the video image is transmitted to transmission system 190. After step 1132, control passes back to step 1102.

In step 1140, video subsystem 104 determines the queue that is associated with the timer that expired. Next (step 1142), video subsystem 104 increments the head pointer associated with the queue determined in step 1140 to point to the next asset identifier set in the queue if the queue determined in step 1140 is associated with the sound recording identifier determined in step 1104. After step 1142, control passes to step 1106.

In another embodiment, the video images that complement the audio service are pre-generated. That is, they are generated prior to the time when they are scheduled to be displayed. For example, they may be generated one day or one week prior to when they are scheduled to be displayed.

In this embodiment where video images are pre-generated, a data structure (e.g., a configuration file) associates the sound recording identifiers listed in a playlist with an ordered set of video image identifiers, where each video image identifier identifies a pre-generated video image. The set may contain one or more video image identifiers. If the ordered set of video image identifiers associated with a sound recording identifier contains more than one video image identifier, then each video image identifier in the set, except the video image identifier that is last in the order, is associated with a time duration. The data structure may also associate purchase information with each sound recording identifier.

Figure 12:
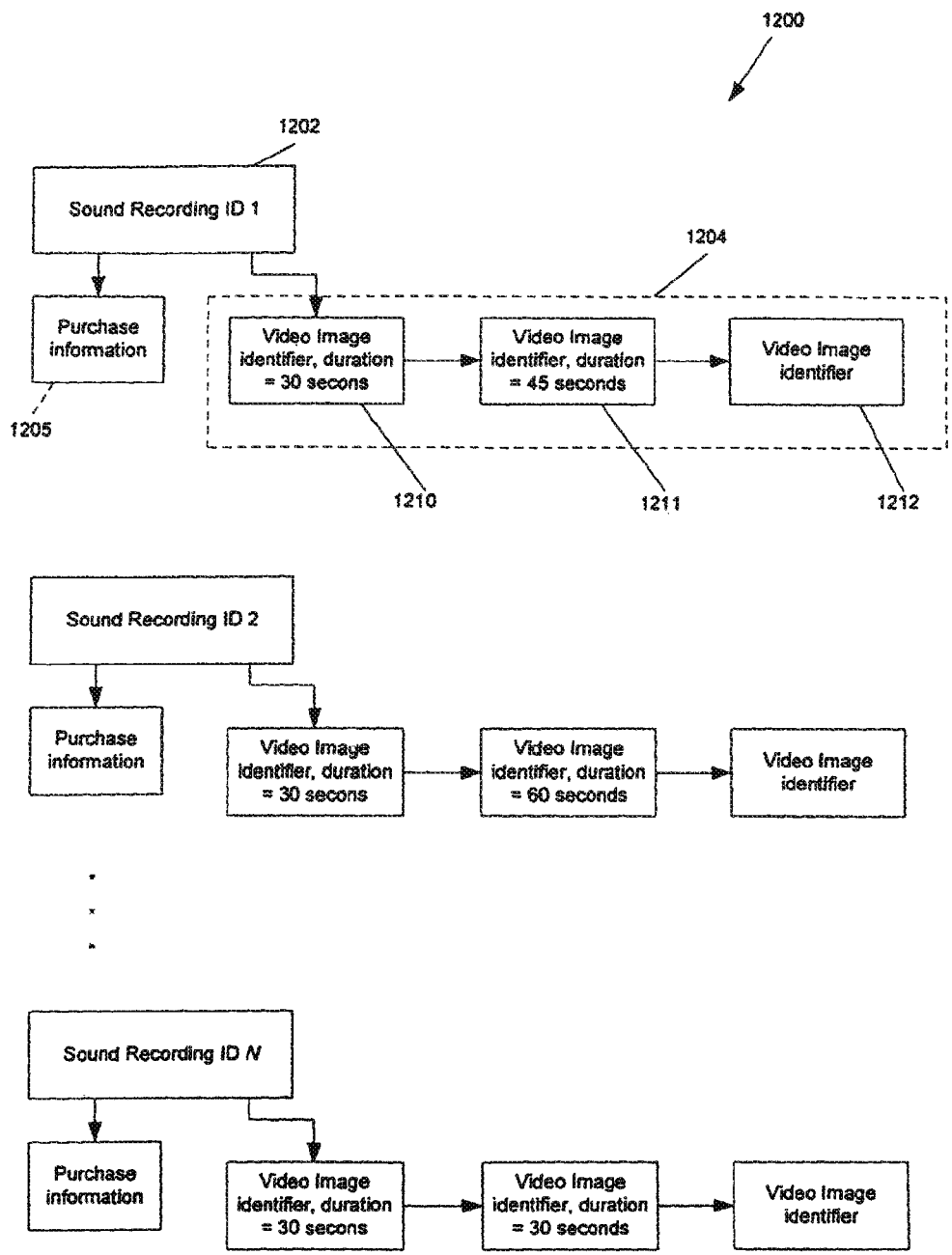
FIG. 12 illustrates an exemplary data structure that associates sound recording identifiers from a playlist with a set of one or more video image identifiers.

FIG. 12 illustrates an exemplary data structure 1200 that associates sound recording identifiers from a playlist with a set of one or more video image identifiers. For example, sound recording identifier 1202 is associated with an ordered set 1204 of video image identifiers and is associated with purchase information 1205.

The ordered set of video image identifiers 1204 includes video image identifiers 1210, 1211, and 1212. Additionally, each video image identifier in set 1204, except for video image identifiers 1212, which is the last video image identifier in the order, is associated with a time duration.

Either video subsystem 104 or transmission system 170 may be able to retrieve the pre-generated video images from the storage unit in which they are stored. Thus, for example, the pre-generated video images may be stored in storage unit 185 or storage unit 186. Similarly, either video subsystem 104 or transmission system 170 may be able to retrieve data structure 1200.

Figure 13:
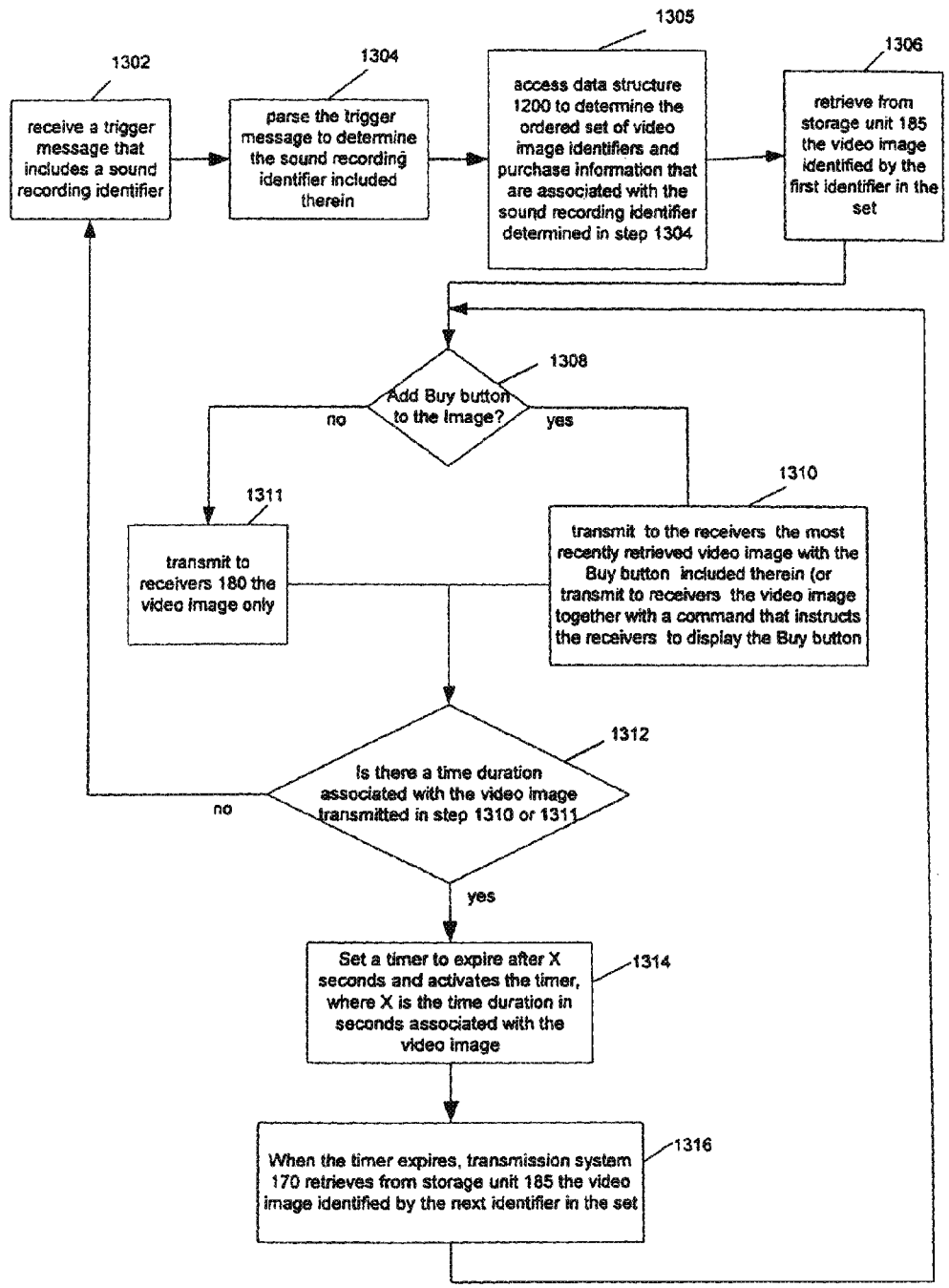
FIG. 13 is a flow chart illustrating a process, according to one embodiment, that is performed by the audio/video signal transmission system 170 when the video images are pre-generated.

If, for example, the pre-generated video images are stored in storage unit 185 and transmission system 170 has access to data structure 1200, then the trigger message generated by audio subsystem 102 may be sent to transmission system 170 instead of to video subsystem 104. In this embodiment, transmission system 170 performs process 1300 (see FIG. 13).

Process 1300 begins in step 1302, where transmission system 170 receives a trigger message that includes a sound recording identifier. Next (step 1304) transmission system 170 parses the trigger message to determine the sound recording identifier included therein. Next (step 1305), transmission system 170 accesses data structure 1200 to determine the ordered set of video image identifiers and purchase information that are associated with the sound recording identifier determined in step 1304. Next (step 1306), transmission system 170 retrieves from storage unit 185 the video image identified by the first identifier in the set.

Next (step 1308), transmission system 170 determines, based on the purchase information (or lack thereof), whether it should overlay Buy button 250 on the video image or send a command to the receivers 180 that causes the receivers to overlay Buy button 205 on the video image. If it should, control passes to step 1310, otherwise control passes to step 1311. In step 1310, transmission system 170 transmits to receivers 180 the most recently retrieved video image with Buy button 250 included in the video image (or transmits to receivers 180 the video image together with a command that instructs receivers 180 to display Buy button 250). In step 1311, transmission system 170 transmits to receivers 180 the video image only.

Next (step 1312), transmission system 170 accesses data structure 1200 to determine whether there is a time duration associated with the video image transmitted in step 1310 or 1311. That is, transmission system 170 determines whether data structure 1200 associates a time duration with the video image identifier that identifies the video image. If there is no time duration associated with the video image, then control passes back to step 1302, otherwise control passes to step 1314. In step 1314, transmission system 170 sets a timer to expire after X seconds and activates the timer, where X is the time duration in seconds associated with the video image transmitted in step 1310 or 1311. When the timer expires, transmission system 170 retrieves from storage unit 185 the video image identified by the next identifier in the set (step 1316) After step 1316, control passes back to step 1308.

Figure 14A:
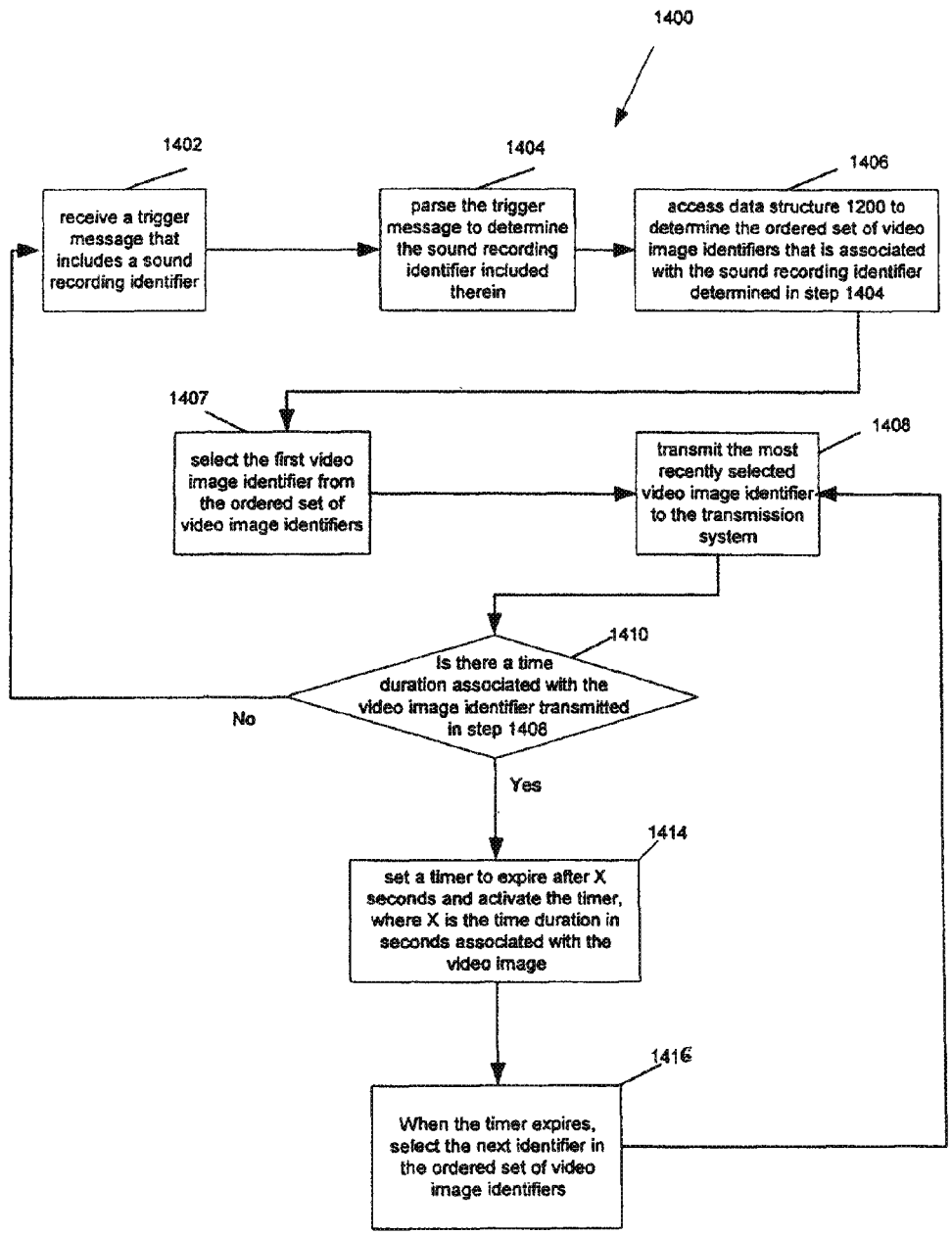
FIG. 14A is a flow chart illustrating a process, according to one embodiment, that is performed by the video subsystem when the video images are pre-generated.
Figure 14B:
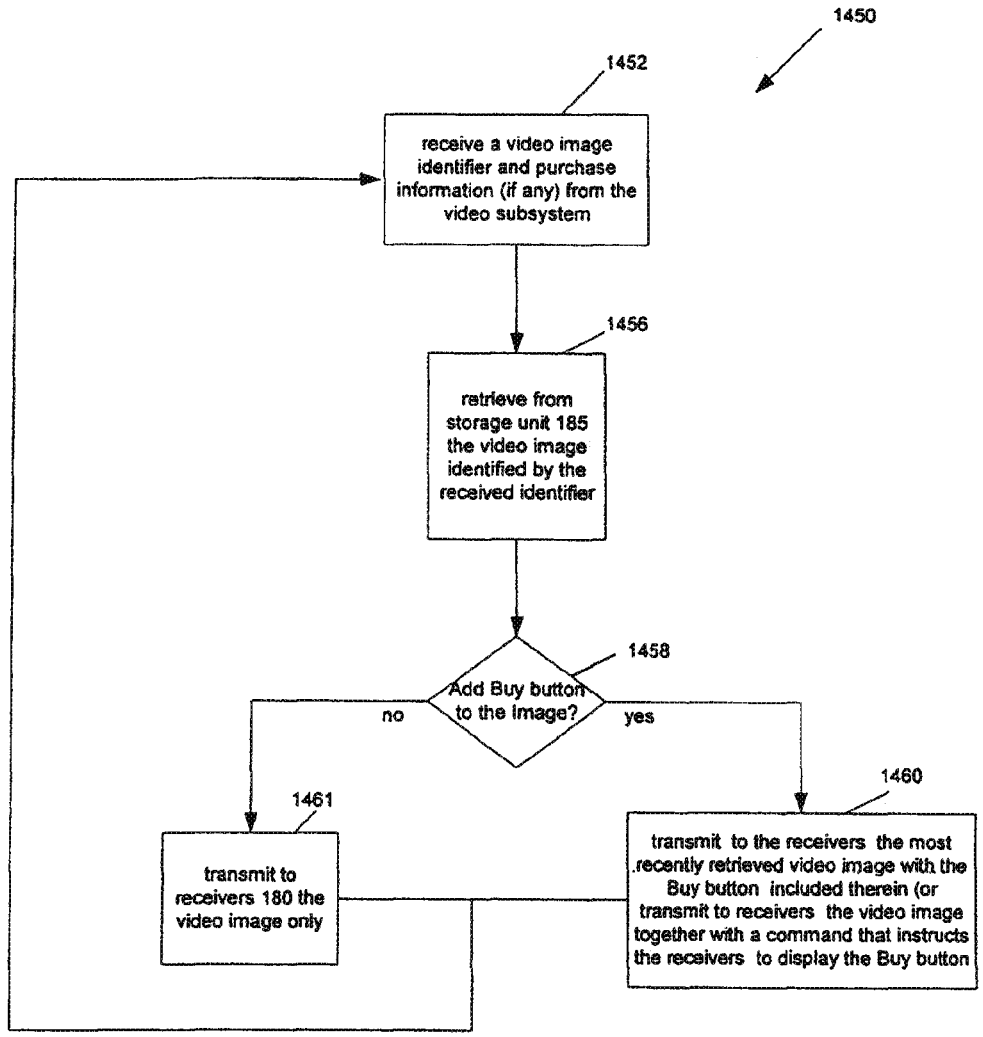
FIG. 14B is a flow chart illustrating a process, according to another embodiment, that is performed by the audio/video signal transmission system when the video images are pre-generated.
Figure 15A:
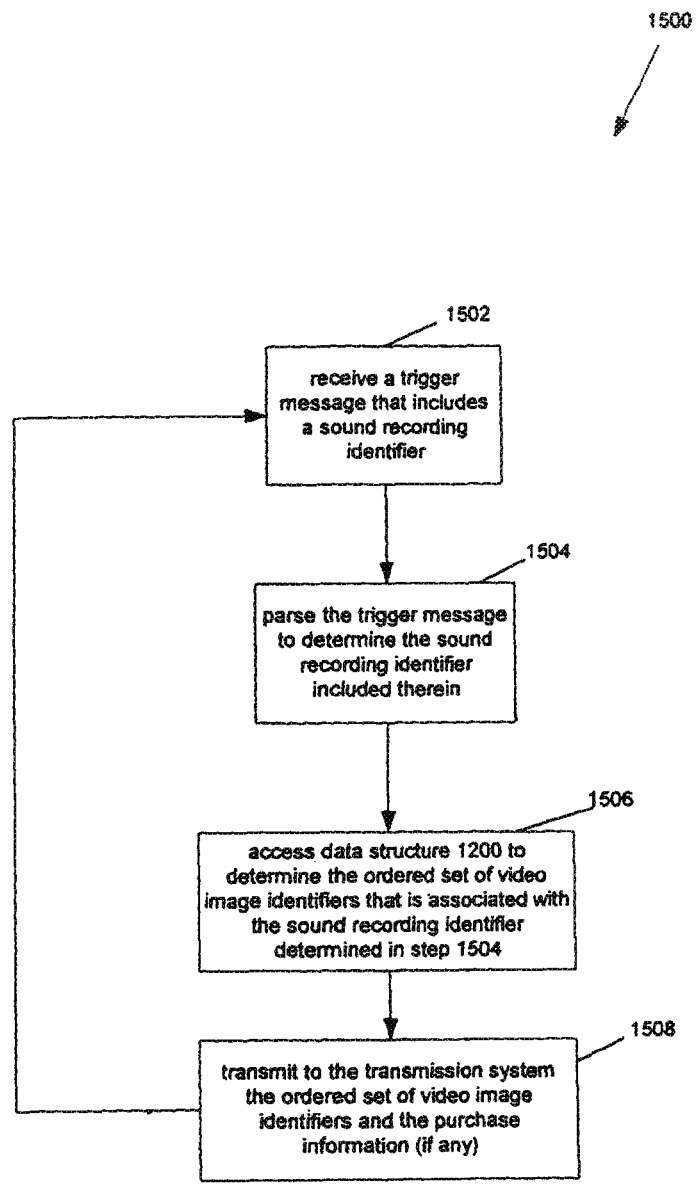
FIG. 15A is a flow chart illustrating a process, according to another embodiment, that is performed by the video subsystem when the video images are pre-generated.
Figure 15B:
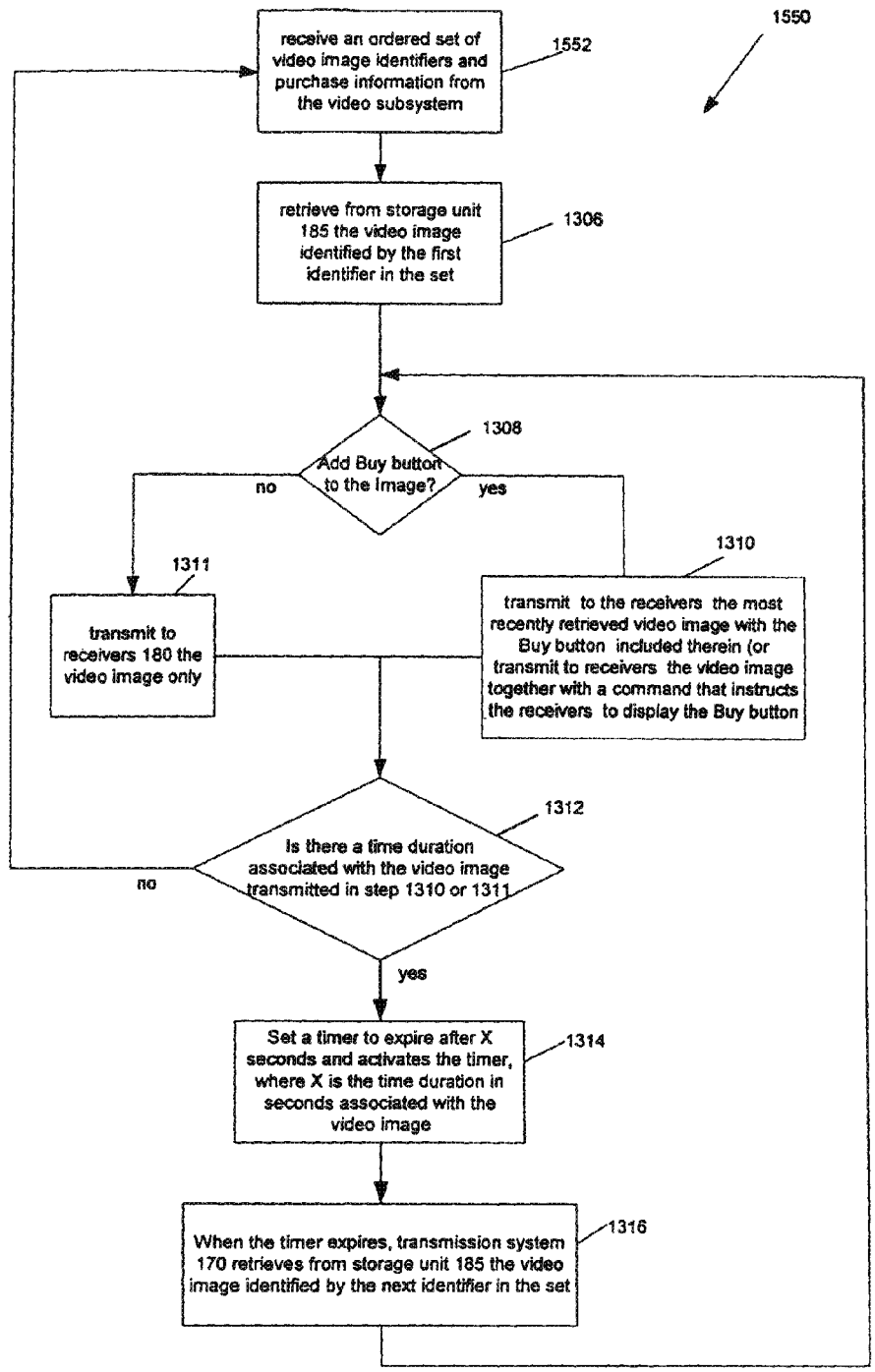
FIG. 15B is a flow chart illustrating a process, according to another embodiment, that is performed by the audio/video signal transmission system when the video images are pre-generated.

If, for example, the pre-generated video images are stored in storage unit 185 but transmission system 170 does not have access to data structure 1200, then the trigger message is sent to video subsystem 104, which will have access to data structure 1200. In this embodiment, video subsystem 104 and transmission system 170 perform processes 1400 (see FIG. 14A) and process 1450 (see FIG. 14B), respectively. Alternatively, video subsystem 104 and transmission system 170 perform processes 1500 (see FIG. 15A and 1550 (see FIG. 15B), respectively.

Process 1400 begins in step 1402, where video subsystem 104 receives a trigger message that includes a sound recording identifier. Next (step 1404) video subsystem 104 parses the trigger message to determine the sound recording identifier included therein. Next (step 1406), video subsystem 104 accesses data structure 1200 to determine the ordered set of video image identifiers that is associated with the sound recording identifier determined in step 1404. Next (step 1407), video subsystem 104 selects the first video image identifier from the ordered set of video image identifiers.

Next (step 1408), video subsystem 104 transmits the most recently selected video image identifier to transmission system 170. In addition to transmitting the video image to transmission system 170, video subsystem may also transmit to transmission system 170 purchase information and/or commands that instruct transmission system 170 to overlay selectable buttons (e.g., Buy button 250) on the video image to create an interactive service for the listeners. After step 1408, control passes to step 1410.

In step 1410, video subsystem 104 accesses data structure 1200 to determine whether there is a time duration associated with the video image identifier transmitted in step 1408. If there is no time duration associated with the video image identifier, then control passes back to step 1402, otherwise control passes to step 1414.

In step 1414, video subsystem 104 sets a timer to expire after X seconds and activates the timer, where X is the time duration in seconds associated with the video image identifier. When the timer expires, video subsystem 104 selects the next identifier in the ordered set (step 1416). After step 1416, control passes back to step 1408.

Process 1450 begins in step 1452, where transmission system 170 receives a video image identifier and purchase information (if any) from video subsystem 104. Next (step 1456), transmission system 170 retrieves from storage unit 185 the video image identified by the received identifier. Next (step 1458), transmission system 170 determines, based on the purchase information (or lack thereof), whether it should overlay Buy button 250 on the video image or send a command to the receivers 180 that causes the receivers to overlay Buy button 205 on the video image. If it should, control passes to step 1460, otherwise control passes to step 1461. In step 1460, transmission system 170 transmits to receivers 180 the retrieved video image with Buy button 250 included in the video image (or transmits to receivers 180 the video image together with a command that instructs receivers 180 to display Buy button 250). In step 1461, transmission system 170 transmits to receivers 180 the video image only. After steps 1460 and 1461 control passes back to step 1452.

Process 1500 begins in step 1502, where video subsystem 104 receives a trigger message that includes a sound recording identifier. Next (step 1504) video subsystem 104 parses the trigger message to determine the sound recording identifier included therein. Next (step 1506), video subsystem 104 accesses data structure 1200 to determine the ordered set of video image identifiers that is associated with the sound recording identifier determined in step 1504. Next (step 1508), video subsystem 104 transmits to transmission system 170 the ordered set of video image identifiers and the purchase information associated with the sound recording identifier. After step 1508, control passes back to step 1502.

Process 1550 is similar to process 1300. Process 1550 begins in step 1552, where transmission system 170 receives the ordered set of video image identifiers and purchase information. After step 1552, transmission system 170 performs steps 1306-1316. After step 1316, control passes back to step 1552.

Figure 16:
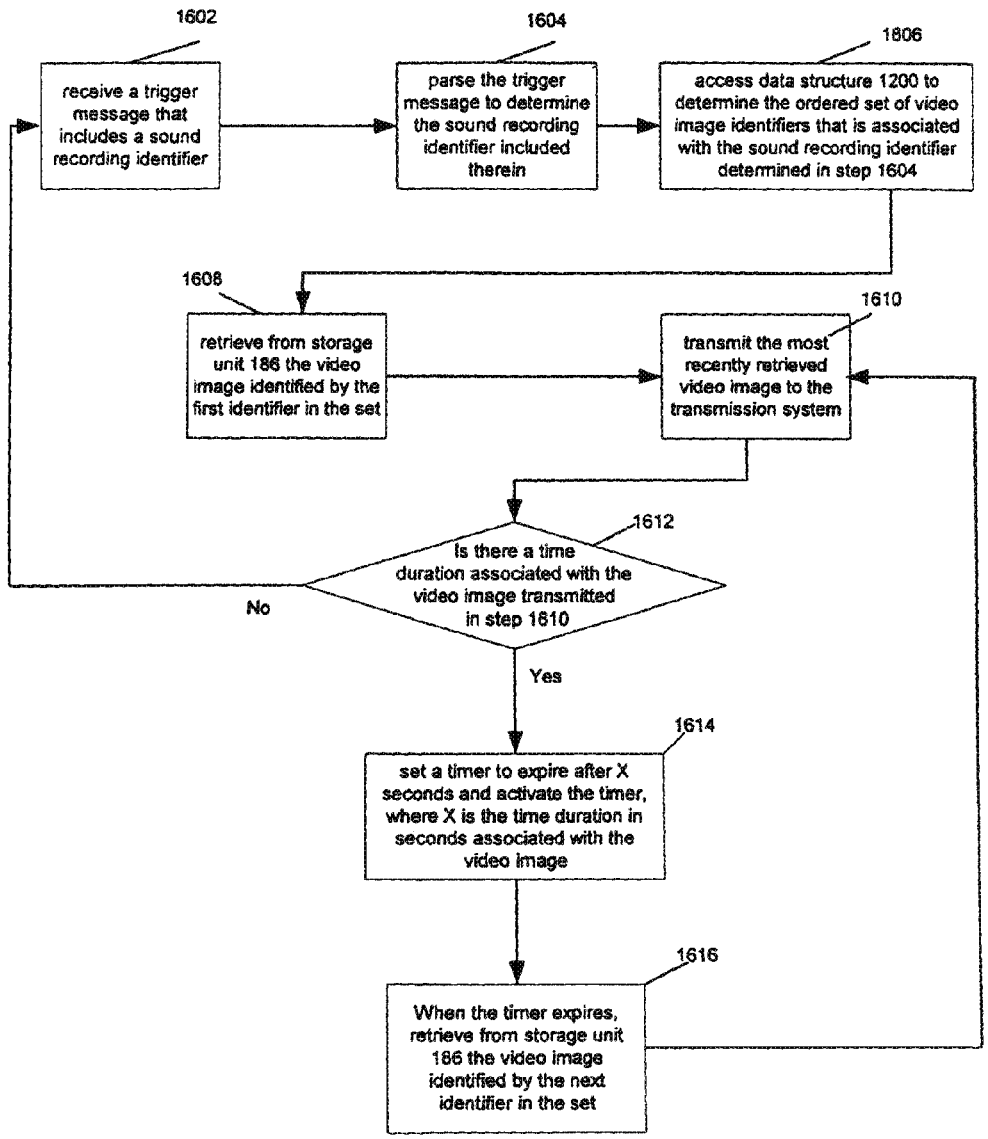
FIG. 16 is a flow chart illustrating a process, according to another embodiment, that is performed by the video subsystem when the video images are pre-generated.

If, for example, the pre-generated video images are stored in storage unit 186 instead of 185 and video subsystem 104 has access to data structure 1200, then the trigger message generated by audio subsystem 102 is sent to video subsystem 104. In this embodiment, video subsystem 104 performs process 1600 (see FIG. 16).

Process 1600 begins in step 1602 where video subsystem 104 receives a trigger message that includes a sound recording identifier. Next (step 1604) video subsystem 104 parses the trigger message to determine the sound recording identifier included therein. Next (step 1606), video subsystem 104 accesses data structure 1200 to determine the ordered set of video image identifiers that is associated with the sound recording identifier determined in step 1604. Next (step 1608), video subsystem 104 retrieves from storage unit 186 the video image identified by the first identifier in the set. Next (step 1610), video subsystem 104 transmits the most recently retrieved video image to transmission system 170. In addition to transmitting the video image to transmission system 170, video subsystem may also transmit to transmission system 170 purchase information and/or commands that instruct transmission system 170 to overlay selectable buttons (e.g., Buy button 250) on the video image to create an interactive service for the listeners. After step 1610, control passes to step 1612.

In step 1612, video subsystem 104 accesses data structure 1200 to determine whether there is a time duration associated with the video image transmitted in step 1610. That is, video subsystem 104 determines whether data structure 1200 associates a time duration with the video image identifier that identifies the video image. If there is no time duration associated with the video image, then control passes back to step 1602, otherwise control passes to step 1614. In step 1614, video subsystem 104 sets a timer to expire after X seconds and activates the timer, where X is the time duration in seconds associated with the video image. When the timer expires, video subsystem 104 retrieves from storage unit 186 the video image identified by the next identifier in the set (step 1616). After step 1616, control passes back to step 1610.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The invention claimed is:

1. A method for providing a visual complement to an audio stream, comprising:
transmitting, from a first transmission system to a second transmission system, audio data corresponding to a selected song; and
transmitting a data packet that was generated using an identifier identifying the selected song, wherein the data packet includes a media asset identifier identifying a media asset and further includes song information associated with the selected song, the song information comprising the title of the song and the name of the artist who recorded the song, wherein
the step of transmitting the data packet comprises transmitting the data packet to a receiving system that is configured such that, in response to receiving the data packet, the receiving system automatically generates a video image using the information included in the data packet and automatically outputs the generated video image such that it is received by a display device that is operable to display the video image to a user of the display device without the user having to select a menu item, and
the generated video image includes the song information comprising the title of the song and the name of the artist.

2. The method of claim 1, wherein the identified media asset is a still image associated with the song.

3. The method of claim 1, further comprising:
after transmitting the data packet to the receiving system and while audio data corresponding to the song is being transmitted, transmitting to the receiving system a second data packet for the song, wherein the second data packet specifies one or more media asset identifiers, each of which identifies one or more media assets, said second data packet further comprising the song information associated with the song.

4. The method of claim 1, further comprising:
selecting the song prior to transmitting, from the first transmission system to the second transmission system, said audio data; and
in response to selecting said song, transmitting to a video subsystem a trigger message, wherein the trigger message comprises an identifier associated with said selected song.

5. The method of claim 4, wherein the video subsystem is configured to generate the data based, at least in part, on pre-defined configuration data and information included in the trigger message.

6. The method of claim 5, wherein the video subsystem is configured to generate the video image specification in response to receiving the trigger message.

7. The method of claim 1, wherein the data packet specifies a screen location that is associated with said media asset identifier.

8. The method of claim 1, wherein the song is a song that falls within a particular category of songs, and said media asset identifier identifies a media asset associated with the particular category.

9. The method of claim 1, wherein the data packet is transmitted while the audio data is being transmitted.

10. The method of claim 1, wherein the video image is encoded according to a Moving Pictures Experts Group (MPEG) standard.

11. The method of claim 1, further comprising:
generating the data packet; and
after generating the data packet, selecting the song from a playlist prior to transmitting the audio data corresponding to the selected song.

12. A system for providing a visual complement to an audio service, the system comprising:
an audio transmission system configured to transmit audio data corresponding to a sound recording specified in a playlist for a linear audio channel; and a receiving system, comprising a receiver and a video image generator, the receiving system being configured to:

i) in response to receiving a data packet that was generated using an identifier identifying the sound recording, generate a video image in accordance with information included in the data packet, wherein the data packet includes a media asset identifier identifying a media asset and further includes sound recording information associated with the sound recording, the sound recording information comprising the title of the sound recording and the name of the artist who recorded the sound recording; and ii) automatically output the generated video image such that it is received at a display device operable to display the video image to a user of the display device without the user having to select a menu item, wherein the generated video image includes the song information comprising the title of the song and the name of the artist, and the receiving system is configured to retrieve the identified media asset and use the retrieved media asset in generating the video image.

13. The system of claim 12, wherein the data packet further includes information specifying a screen location that is associated with said media asset identifier.

14. The system of claim 12, wherein the sound recording is a song that falls within a particular category of songs, and said media asset identifier identifies a media asset associated with the particular category.

15. The system of claim 12, wherein the video image is encoded according to a Moving Pictures Experts Group (MPEG) standard.

16. The system of claim 12, wherein said media asset identifier identifies a media asset associated with the sound recording.

17. A method for providing a visual complement to an audio stream, the method being performed by a music multicast system for providing said audio stream to a plurality of users essentially simultaneously and comprising:

the music multicast system automatically selecting a song from a set of available songs;

the music multicast system generating a data packet based on the selected song, the data packet including a media asset identifier identifying a media asset and further including song information associated with the selected song, the song information comprising the title of the song and the name of the artist who recorded the song;

as a result of automatically selecting the song, transmitting, from a first transmission system to a second transmission system, said audio stream, wherein said audio stream consists of audio data corresponding to said selected song; and transmitting the data packet to a receiving system, wherein the receiving system is configured such that, in response to receiving the data packet, the receiving system automatically generates a video image using the information included in the data packet and automatically outputs the generated video image such that it is received by a display device that is operable to display the video image to a user of the display device without the user having to select a menu item, and the generated video image includes the song information comprising the title of the song and the name of the artist and a still image identified by the media asset identifier.

\* \* \* \* \*